United States Patent
Matsushita

(10) Patent No.: US 10,828,563 B2
(45) Date of Patent: Nov. 10, 2020

(54) INFORMATION PROCESSING SYSTEM, SERVER, STORAGE MEDIUM STORING INFORMATION PROCESSING PROGRAM, AND INFORMATION PROCESSING METHOD

(71) Applicant: NINTENDO CO., LTD., Kyoto (JP)

(72) Inventor: Shingo Matsushita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/695,166

(22) Filed: Sep. 5, 2017

(65) Prior Publication Data
US 2018/0085669 A1  Mar. 29, 2018

(30) Foreign Application Priority Data

Sep. 23, 2016 (JP) ................................. 2016-185225
Sep. 23, 2016 (JP) ................................. 2016-185226

(51) Int. Cl.
*A63F 13/35* (2014.01)
*A63F 13/63* (2014.01)
(Continued)

(52) U.S. Cl.
CPC .............. *A63F 13/35* (2014.09); *A63F 13/25* (2014.09); *A63F 13/332* (2014.09);
(Continued)

(58) Field of Classification Search
CPC ........ A63F 13/35; A63F 13/63; A63F 13/822; A63F 13/69; A63F 13/58; A63F 13/322; A63F 13/92; A63F 13/46; A63F 13/25
See application file for complete search history.

(56) References Cited

U.S. PATENT DOCUMENTS 8,052,518 B1   11/2011 Kelly et al.
8,460,088 B1    6/2013 Shimizu
(Continued)

FOREIGN PATENT DOCUMENTS

JP   2013-172955   9/2013
JP   2014-229268   12/2014
(Continued)

OTHER PUBLICATIONS

Office Action dated Aug. 8, 2018 issued in Japanese Application No. 2016-185225 (4 pgs.).
(Continued)

*Primary Examiner* — Kang Hu
*Assistant Examiner* — Thomas H Henry
(74) *Attorney, Agent, or Firm* — Nixon & Vanderhye P.C.

(57) ABSTRACT

An example of an information processing system includes a server capable of communicating with a terminal device. The server stores information representing a choice probability, for each of a plurality of objects in the application, for a draw whereby a user obtains an object. The information processing system accepts an instruction of specifying a relevant object to be associated with the draw. The server alters the choice probability at least for some of the objects depending on the relevant object. In response to a draw instruction, the server chooses at least one object from among the objects that can be obtained through a draw based on the choice probability obtained by altering the choice probability. The server awards one or more of the chosen objects to the user.

16 Claims, 17 Drawing Sheets

| SUMMONER CHARACTER | PROBABILITY-ALTERED CHARACTER | RELEVANCE |
|---|---|---|
| CHARACTER A | CHARACTER B | +10 |
| CHARACTER C | CHARACTER D | +5 |
| ⋮ | ⋮ | ⋮ |

(51) Int. Cl.

| | |
|---|---|
| *A63F 13/69* | (2014.01) |
| *A63F 13/58* | (2014.01) |
| *A63F 13/332* | (2014.01) |
| *A63F 13/335* | (2014.01) |
| *A63F 13/92* | (2014.01) |
| *A63F 13/46* | (2014.01) |
| *A63F 13/25* | (2014.01) |
| *A63F 13/822* | (2014.01) |
| *H04L 29/06* | (2006.01) |

(52) U.S. Cl.
CPC ............ *A63F 13/335* (2014.09); *A63F 13/46* (2014.09); *A63F 13/58* (2014.09); *A63F 13/63* (2014.09); *A63F 13/69* (2014.09); *A63F 13/822* (2014.09); *A63F 13/92* (2014.09); *H04L 67/38* (2013.01)

(56) References Cited

U.S. PATENT DOCUMENTS

| | | | | |
|---|---|---|---|---|
| 2012/0129590 | A1* | 5/2012 | Morrisroe | A63F 13/65 463/25 |
| 2014/0004955 | A1* | 1/2014 | Nahari | A63F 13/12 463/42 |
| 2014/0351089 | A1 | 11/2014 | Kawamoto et al. | |
| 2016/0144276 | A1* | 5/2016 | Ukai | A63F 13/69 463/31 |

FOREIGN PATENT DOCUMENTS

| | | |
|---|---|---|
| JP | 5712445 | 5/2015 |
| JP | 2015-104411 | 6/2015 |
| JP | 2015-178013 | 10/2015 |
| JP | 5841276 | 11/2015 |
| JP | 2016-036572 | 3/2016 |
| JP | 2016-097245 | 5/2016 |
| JP | 2016-154794 | 9/2016 |

OTHER PUBLICATIONS

Matsushita, et al., U.S. Appl. No. 15/695,152, filed Sep. 5, 2017 (98 pages).
U.S. Appl. No. 15/695,152, filed Sep. 5, 2017, Information Processing System, Server, Storage Medium Storing Information Processing Program, and Information Processing Method.
U.S. Appl. No. 15/695,166, filed Sep. 5, 2017, Information Processing System, Server, Storage Medium Storing Information Processing Program, and Information Processing Method.
Office Action dated Jul. 27, 2018 issued in JP Application No. 2016-185226 (4 pages).
Office Action dated Oct. 9, 2018 issued in U.S. Appl. No. 15/695,152 (17 pgs.).
Notice of Reasons for Refusal in JP Application No. 2016-185225 dated Feb. 8, 2019 (4 pages).
Notice of Reasons for Refusal in JP Application No. 2016-185225 dated Dec. 6, 2018 with Machine Translation (9 pages).
Love live ! school idol festival—after school Activity—Degeki Arcade, May 23, 2016, [online] searched on Heisei 30 (2018) Nov. 27 URL, http://dengekionline.com/elem/000/001/279/1279625, (14 pages).
Notice of Reasons for Refusal in JP Application No. 2016-185226 dated Feb. 8, 2019 (4 pages).
Ensamble Stars, Dengeki Girl's Style, vol. 6, No. 10 Kadokawa Corporation, Jun. 10, 2015, vol. 6, pp. 170-171.
Notice of Reasons for Refusal dated Jul. 22, 2019 in JP Patent Application No. 2016-185225 with its English machine translation.
Final Office Action for U.S. Appl. No. 15/695,152, 10 pages, dated Jul. 17, 2019.
Notice of Allowance for U.S. Appl. No. 15/695,152, nine pages, dated Jan. 8, 2020.

\* cited by examiner

Fig.5
| RED ATTRIBUTE |  | CHARACTER A, CHARACTER B, ··· |
|---|---|---|
| BLUE ATTRIBUTE |  | CHARACTER C, CHARACTER D, ··· |
| GREEN ATTRIBUTE |  | CHARACTER E, CHARACTER F, ··· |
| CLEAR-COLOR ATTRIBUTE |  | CHARACTER G, CHARACTER H, ··· |

Fig.15

| SUMMONER CHARACTER | PROBABILITY-ALTERED CHARACTER | RELEVANCE |
|---|---|---|
| CHARACTER A | CHARACTER B | +10 |
| CHARACTER C | CHARACTER D | +5 |
| ⋮ | ⋮ | ⋮ |

INFORMATION PROCESSING SYSTEM, SERVER, STORAGE MEDIUM STORING INFORMATION PROCESSING PROGRAM, AND INFORMATION PROCESSING METHOD

CROSS REFERENCE TO RELATED APPLICATION

The disclosure of Japanese Patent Application Nos. 2016-185225 and 2016-185226, both filed on Sep. 23, 2016, is incorporated herein by reference.

FIELD

The present technique relates to an information processing system, a server, a storage medium storing information processing program, and an information processing method for awarding objects to a user by a draw of lots, for example, in an application.

BACKGROUND AND SUMMARY

Applications such as games conventionally award a user with a game object (e.g., a game character, an item, etc.) that is chosen by a draw of lots (termed "Gacha").

Conventionally, a Gacha draw simply awards a user with an object that is chosen according to a predetermined rule, and there is no room for user's intention to be reflected in the process of the draw. This has resulted in a problem that the user is easily frustrated with the draw result.

Thus, the present application discloses an information processing system, a server, a storage medium storing information processing program and an information processing method, with which the user's intension can be reflected in the draw-based object awarding process.

(1)

An example of the information processing system described in the present specification includes a server capable of communicating with a terminal device capable of executing an application. The information processing system includes a storage unit, a specification instruction accepting unit, a probability alteration unit, a choosing unit and an object awarding unit. The storage unit is provided on the server and configured to store information representing a choice probability, for each of a plurality of objects in the application executed on the terminal device, for a draw whereby a user of the application obtains an object. The specification instruction accepting unit accepts an object specification instruction of specifying a relevant object to be associated with the draw from among the objects in the application. The probability alteration unit is provided on the server and alters the choice probability at least for some of the objects depending on the specified relevant object. The choosing unit is provided on the server and chooses at least one object from among the objects that can be obtained through a draw based on the altered choice probability obtained by altering the choice probability. The object awarding unit is provided on the server and awards one or more of the chosen objects to the user.

(2)

The specification instruction accepting unit may accept an object specification instruction of specifying the relevant object from among the objects owned by the user in the application.

(3)

The specification instruction accepting unit may accept an object specification instruction of specifying the relevant object from among the objects that can be obtained through a draw.

(4)

The storage unit may store relevance information representing relevance between at least some of the objects in the application and other objects. The probability alteration unit may alter the choice probability based on the relevance information assigned to the specified relevant object.

(5)

The probability alteration unit may alter the choice probability assigned to an object that is associated in the relevance information with the relevant object so that the object is more likely to be chosen.

(6)

The storage unit may store the number of points owned by the user in the application. The specification instruction accepting unit may accept the draw instruction from the user at least on the condition that a predetermined number of points are subtracted from the points owned by the user. The choosing unit may choose at least one of the objects in response to the draw instruction.

(7)

The choosing unit may choose an object at least on the condition that a predetermined number of points are subtracted from the points owned by the user in response to receiving, from the terminal device, instruction information including the draw instruction and the object specification instruction.

(8)

The information processing system may further include a point awarding unit. The point awarding unit increases the number of points stored in the storage unit for a user on the condition that the user is charged for the added points.

(9)

The choosing unit may choose a plurality of objects from among the objects. The object awarding unit may award one of the plurality of chosen objects that is selected by the user to the user.

(10)

The information processing system may include a display control unit and a selection instruction accepting unit. The display control unit displays predetermined information assigned to the plurality of chosen objects on a display section of the terminal device. The selection instruction accepting unit accepts a selection instruction from the user of selecting one of the predetermined information displayed on the display. The object awarding unit may award an object corresponding to the predetermined information selected by the selection instruction to the user.

(11)

The probability alteration unit may alter the choice probability based on the predetermined information assigned to the specified relevant object.

(12)

The specification instruction accepting unit may receive the object specification instruction that is transmitted from the terminal device based on an input from the user performed on the terminal device, thereby accepting the instruction.

(13)

The information processing system may further include a game process unit configured to execute a predetermined game process using an object that has been awarded to the user.

Note that the present specification discloses examples of the server and the terminal device set forth in (1) to (13) above, and discloses a storage medium storing information processing program instructing a computer of an information processing device to function as the various units of the server or the terminal device. The present specification also discloses an information processing method to be executed on the information processing system set forth in (1) to (13) above.

With the information processing system, the server, the storage medium storing information processing program and the information processing method set forth above, user's intention can be reflected in the draw-based object awarding process.

These and other objects, features, aspects and advantages will become more apparent from the following detailed description when taken in conjunction with the accompanying drawings.

BRIEF DESCRIPTION OF THE DRAWINGS

FIG. 5 is a diagram showing example attributes to be assigned to characters;

FIG. 15 is a diagram showing an example of character relevance information;

DETAILED DESCRIPTION OF NON-LIMITING EXAMPLE EMBODIMENTS

First Embodiment

[1. General Configuration of System]

Figure 1:
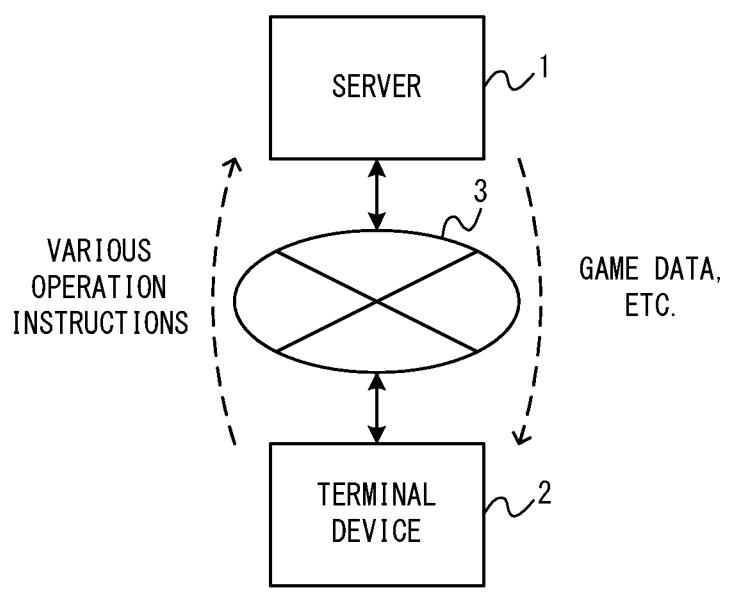
FIG. 1 is a block diagram showing an example configuration of an information processing system according to the present embodiment.

An information processing system, a server, an information processing device, an information processing program and an information processing method according to a first embodiment will now be described. First, the generation configuration of the information processing system according to the first embodiment, and the configuration of the terminal device application and the server included in the information processing system will be described. FIG. 1 is a block diagram showing an example configuration of the information processing system according to the present embodiment. As shown in FIG. 1, the information processing system includes a server 1 and a terminal device 2. The server 1 and the terminal device 2 can be connected to a network 3 such as the Internet and/or mobile communication network. The server 1 and the terminal device 2 can communicate with each other via the network 3.

The server 1 is a server that provides service related to an application executed on the terminal device 2. In the first embodiment, the server 1 is a game server configured to execute a game application on the terminal device 2. The server 1 provides an environment for executing a game of the game application on the terminal device 2. For example, in response to a request from the terminal device 2 executing the game application, the server 1 executes a game process as necessary and transmits game data to the terminal device 2 in response to the request.

The terminal device 2 is an example of an information processing device of a user, and the terminal device 2 may be a smartphone, a portable type or home-console type game device, a mobile phone, a tablet terminal, a wearable terminal, or the like, for example. The terminal device 2 is capable of executing a game application of which service is provided by the server 1. Note that FIG. 1 shows only one terminal device 2, but the information processing system may include a plurality of terminal devices.

(Specific Example of Configuration of Server 1)

Figure 2:
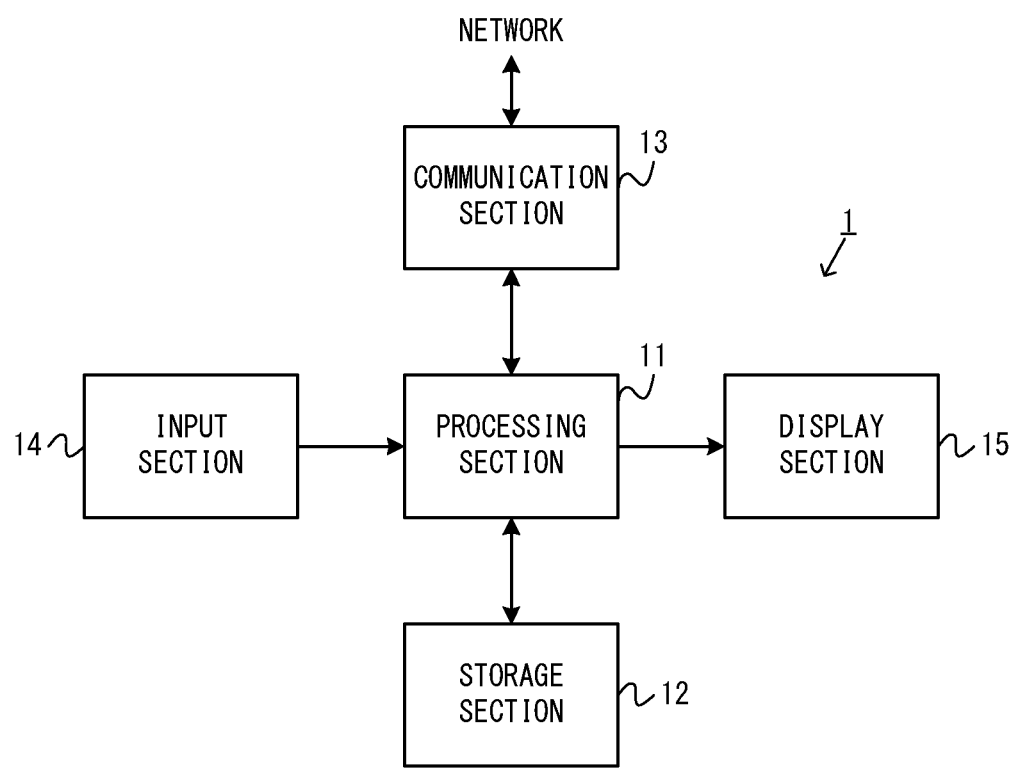
FIG. 2 is a block diagram showing an example configuration of a server.

FIG. 2 is a block diagram showing an example configuration of the server 1. Various elements of the server 1 shown in FIG. 2 are implemented by one or more information processing devices. Herein, a "server" as used in the present specification refers to a single information processing device (i.e., a server device), and when the functions of the server are implemented by a plurality of server devices, it also refers to a whole server device group (i.e., a server system). Thus, a "server" may be a server device or may be a server system. Note that the hardware configuration of the server 1 of the first embodiment may be similar to those of conventional servers.

As shown in FIG. 2, the server 1 includes a processing section 11 and a storage section 12. The processing section 11 is electrically connected to various sections 12 to 15 of the server 1. The processing section 11 includes a CPU (Central Processing Unit) and a memory. In the server 1, the CPU executes various information processes by executing programs stored in the storage section 12 using the memory. The storage section 12 may be any storage device (referred to also as a "storage medium") that can be accessed by the processing section 11. The storage section 12 stores programs to be executed by the processing section 11, data to be used in information processes by the processing section 11, and data obtained by the information processes, etc. In the present embodiment, the storage section 12 at least stores programs (referred to as "server-side game programs") for game processes executed on the server side for game processes executed on the terminal device 2.

The server 1 includes a communication section 13. The communication section 13 has the function of connecting to the network 3 and communicating with another device (e.g., the terminal device 2) via the network 3. The server 1 includes an input section 14 and a display section 15 as input/output interfaces. For example, when there is an update to the game of which service is provided by the server 1 (i.e., a game application to be executed by the server-side game program and/or the terminal device 2), the server administrator updates the game by using the input/output interfaces.

(Specific Example of Configuration of Terminal Device 2)

Figure 3:
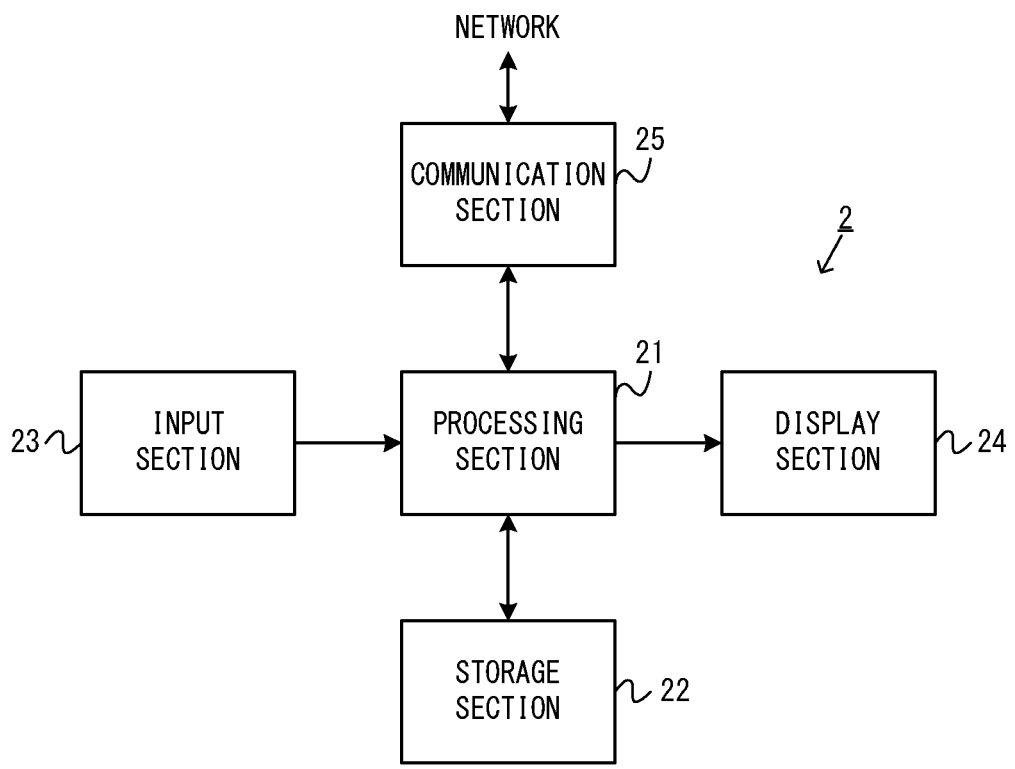
FIG. 3 is a block diagram showing an example configuration of a terminal device.

FIG. 3 is a block diagram showing an example configuration of the terminal device 2. As shown in FIG. 3, the terminal device 2 includes a processing section 21 and a storage section 22. The processing section 21 is electrically connected to the various sections 22 to 25 of the terminal device 2. The processing section 21 includes a CPU (Central Processing Unit) and a memory. In the terminal device 2, the CPU executes various information processes by executing programs (including the game application described above) stored in the storage section 22 using the memory. The storage section 22 stores programs to be executed by the processing section 21, data to be used in information processes by the processing section 21, and data obtained by the information processes, etc.

The terminal device 2 includes an input section 23. The input section 23 may be any input device configured to accept an input from the user. In the first embodiment, the input section 23 includes a touch panel provided on the screen of a display section 24 to be described later. Note that the input section 23 may include a button and/or inertia sensor (e.g., an acceleration sensor or a gyrosensor), etc., in addition to (or instead of) the touch panel.

The terminal device 2 includes the display section 24. The display section 24 displays an image (e.g., a game image, etc.) generated by information processes executed by the processing section 21 of the terminal device 2. Note that the terminal device 2 may include a speaker, a microphone and/or a camera, etc.

The terminal device 2 includes a communication section 25. In the first embodiment, the communication section 25 has the function of connecting to a mobile communication network (in other words, a mobile phone communication network) for communication. That is, the terminal device 2 (specifically, the processing section 21) communicates with another device (e.g., the server 1, etc.) by connecting to the network 3 via a mobile communication network using the communication section 25 (in other words, via the communication section 25). Note that any configuration of the communication section may be used for the terminal device 2 to communicate via the network 3. For example, the communication section 25 may have the function of connecting to a wireless LAN by means of a Wi-Fi-certified communication module, or may have both the function of connecting to a mobile communication network and the function of connecting to a wireless LAN.

Note that the terminal device 2 may include other elements in addition to those shown in FIG. 3. For example, the terminal device 2 may have the function of NFC-based communication and/or the function (e.g., the GPS function) of detecting the position of the terminal device 2, etc.

[2. Outline of Operation of Information Processing System]

Next, referring to FIG. 4 to FIG. 7, the operation of the information processing system will be outlined. The following description is directed primarily to the flow of a process of a game executed on the terminal device 2 in the draw mode of executing a draw ("Gacha") through which the user acquires a game object. In the first embodiment, the user playing the game can acquire characters appearing in the game by a draw, and play the game using the acquired characters. Note that there is no limitation on the content (in other words, genre) of the game executed on the terminal device 2, and the game may be any type of a game. In other embodiments, objects that can be acquired through a draw are not limited to game characters as described above, but may be any objects such as items, or the like, appearing in the game, for example.

In the first embodiment, a draw can be performed in exchange for an item or items that can be used in the game (an orb or orbs in the first embodiment). That is, the user can own orbs in the game, and can perform a draw by consuming a predetermined number of orbs. Note that it can be said that the number of orbs represents the number of points that can be used for a draw. It can also be said that orb is a virtual currency that can be used in the game. Orbs may be able to be used for other, non-drawing purposes in the game (e.g., for the purpose of purchasing items, or purchasing additional game levels).

As described above, in the first embodiment, there is a charge for obtaining orbs to be used for a draw. In other embodiments, the information processing system may charge for a draw itself. That is, the information processing system may accept an instruction to draw (i.e., a draw instruction to be described later) on the condition that the user is charged for the draw.

In the first embodiment, orb is an item that can be purchased. That is, the user can obtain orbs for a fee. Note that there is no limitation on the method for the user to purchase orbs (in other words, the method by which the service provider charges), and the method may be similar to conventional methods. For example, the user can make a deposit that can be used to pay for the service so that payments are subtracted from the deposit, or payments may be made with a credit card.

Note that orbs may be obtained by a method other than purchasing them. For example, a predetermined number of orbs may be given to the user on the condition that the user completes a game level, or a predetermined number of orbs may be given to the user on the condition that the user's account for the game is registered.

Figure 4:
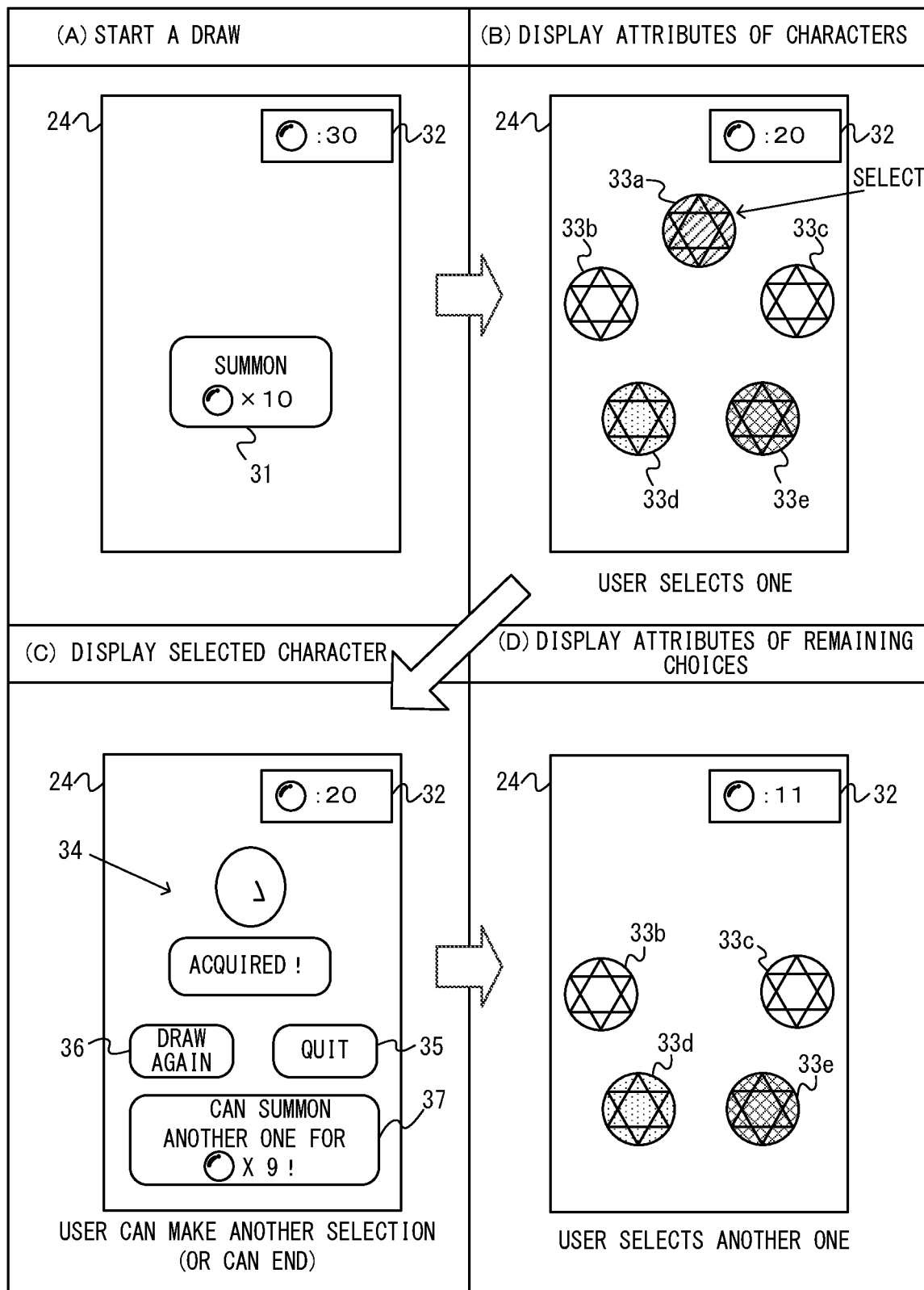
FIG. 4 is a diagram showing example images to be displayed on a terminal device in a draw mode.

Referring to FIG. 4 and FIG. 5, the draw process to be executed in the first embodiment will now be outlined. FIG. 4 is a diagram showing example images to be displayed on the terminal device 2 in the draw mode. In the first embodiment, the draw mode is started in response to the user making a predetermined switching instruction, for example, during the play of the game where a game image is displayed on the display section 24.

When the draw mode is started, the terminal device 2 displays a draw instruction image 31 on the display section 24 as shown in FIG. 4(A). The draw instruction image 31 represents an instruction to perform a draw (referred to as a "draw instruction"). Note that in the game of the first embodiment, acquiring a character through a draw is expressed as summoning a character from another world. Therefore, the draw instruction image 31 contains the word "summon" meaning to draw.

The draw instruction image 31 represents the number of orbs (herein, ten) to be consumed for a draw. That is, in the first embodiment, a draw instruction is given on the condition that orbs are consumed (the details of which will be described later). Note that when the draw instruction image 31 is displayed, a user's orb count image 32 (30 in (A) of FIG. 4), representing the number of orbs currently owned by the user, is displayed on the display section 24.

The user can give a draw instruction by performing an operation of specifying the draw instruction image 31 (i.e., an operation of touching the draw instruction image 31). In response to a draw instruction given, a character is drawn on the server 1 side, and the draw result is transmitted from the server 1 to the terminal device 2. Note that although the details of the method of drawing will be described later, a predetermined number (herein, five) of initial candidates are chosen from a pool of characters ("draw-object characters") that can be acquired through a draw in the first embodiment. These characters chosen will be hereinafter referred to as "selection candidate characters".

When the draw result is received, the terminal device 2 displays, on the display section 24, a selection image used for accepting a selection instruction, as shown in FIG. 4(B). A selection instruction is an instruction to select one of the selection candidate characters.

In the first embodiment, the selection image includes attribute symbols 33 (specifically, five attribute symbols 33*a* to 33*e*) as shown in FIG. 4(B). An attribute symbol 33 represents the attribute of a selection candidate character. Thus, in the first embodiment, a set of choices of characters that can be acquired by the user are presented while the selection candidate characters themselves cannot be identified (i.e., while only the attributes of the selection candidate characters can be identified).

Herein, in the first embodiment, each character is pre-assigned one of the red attribute, the blue attribute, the green attribute and the clear-color attribute. FIG. 5 shows example attributes to be assigned to characters. As shown in FIG. 5, in the first embodiment, each character is classified into one of the four attributes. Note that the server 1 stores, for each character, information (attribute information to be described later) representing the attribute assigned to the character so that the attribute information is associated with the character. Note that in the first embodiment, characters are assigned to different attributes depending on the weapons used by the characters. Specifically, the red attribute is assigned to characters using a sword, the blue attribute to characters using a spear, the green attribute to characters using an axe, and the clear-color attribute to characters using other weapons. In the present embodiment, the attribute symbol representing the red attribute is red, the attribute symbol representing the blue attribute is blue, the attribute symbol representing the green attribute is green, and the attribute symbol representing the clear-color attribute is white.

Note that in other embodiments, a plurality of attributes may be assigned to one character. Then, the attribute symbol may represent any one of the plurality of attributes assigned to the character. Note that one attribute represented by the attribute symbol of a character that is assigned with a plurality of attributes may be randomly determined, may be determined in advance, or may be determined based on a predetermined condition (e.g., a condition related to parameters of the character). For example, the attribute symbol of a character that is assigned with the red attribute and the blue attribute may represent the red attribute or may represent the blue attribute. Alternatively, the attribute symbol may represent the plurality of attributes assigned to the character. For example, the attribute symbol of a character that is assigned with the red attribute and the blue attribute may have a first half thereof in red and the other half in blue so as to represent both the red attribute and the blue attribute.

Note that the attribute of a character is information assigned to the character, and may be assigned based on type, state, property, ability, etc., of the character, for example. Attribute may be any information based on which characters can be classified into a number of classes (fewer than the number of characters).

When a selection image is displayed on the display section 24, the user can give a selection instruction to select a selection candidate character. Specifically, a selection instruction is given by performing an operation of specifying one of the attribute symbols 33 (i.e., an operation of touching an attribute symbol).

Thus, in the first embodiment, in a draw for acquiring a character, the user can select one of five choices that have been chosen through a draw. For example, when a selection image shown in FIG. 4(B) is displayed, the attribute symbol 33*a* representing the red attribute, the attribute symbols 33*b* and 33*c* representing the clear-color attribute, the attribute symbol 33*d* representing the green attribute and the attribute symbol 33*e* representing the blue attribute are displayed. Then, the user can select the attribute symbol 33 representing the attribute of the character the user wishes to have. For example, when the user wishes to have a particular character of the red attribute, or any character that uses a sword, the user may select the attribute symbol 33*a* representing the red attribute. That is, according to the first embodiment, user's intention can be reflected in the draw, and the user is more likely to obtain a desired draw result. Thus, it is possible to reduce the possibility that the user feels unsatisfied with the draw result. Therefore, in the first embodiment, it is possible to reduce the possibility that the user feels unsatisfied with the draw result.

When the user selects one attribute symbol 33 by giving a selection instruction, a selection candidate character corresponding to the selected attribute symbol is given to the user. Then, as shown in FIG. 4(C), the terminal device 2 displays, on the display section 24, an acquisition image 34 indicating that the user has acquired the selection candidate character. The acquisition image 34 includes information (e.g., the face of the character, etc.) with which it is possible to identify the acquired character. Thus, the user can know which selection candidate character the user has acquired.

As described above, in the first embodiment, the selection image includes attribute symbols 33 corresponding to characters and does not include information with which it is possible to identify any individual character (e.g., the face, the name, etc., of the character) (FIG. 4(B)). Then, the user can know what the character selected by the user is after giving a selection instruction. Thus, it is made impossible to completely identify the selection candidate character at the point when the user makes the selection. This enhances the playability of the draw while preventing the draw from being too advantageous for the user.

In the first embodiment, since the attribute symbols 33 are displayed in the selection image, it is possible to give the user a basis of judgment for selection, instead of making the user select a selection candidate character merely by intuition. Therefore, it is possible to enhance the strategic aspect of the game and improve the playability of the game.

In the first embodiment, when the acquisition image 34 is displayed on the display section 24, the terminal device 2 accepts an instruction from the user whether or not to draw again. Specifically, as shown in FIG. 4(C), an end instruction image 35 and a continue instruction image 36 are displayed. The end instruction image 35 is an image representing an end instruction to end the draw state. The user can give an end instruction by performing an operation of specifying the end instruction image 35 (i.e., an operation of touching the end instruction image 35). The continue instruction image 36 is an image representing a continue instruction to continue the draw state (i.e., a selection is made again). The user can give a continue instruction by performing an operation of specifying the continue instruction image 36.

Note that as shown in FIG. 4(C), when the continue instruction image 36 is displayed, a notification image 37 is displayed, notifying of the number of orbs needed to make a selection again in the first embodiment (FIG. 4(C)). The number of orbs needed to make a selection again will be described later.

When the continue instruction is given, the terminal device 2 displays the selection image again as shown in FIG. 4(D). The selection image includes attribute symbols 33 representing the attributes of the remaining selection candidate characters excluding those characters that have been selected. The example of FIG. 4(D) shows a case in which the attribute symbol 33a representing the red attribute has been selected in the first draw, from among the five attribute symbols 33a to 33e shown in FIG. 4(B), specifically, a case in which a selection image including the remaining four attribute symbols 33b to 33e is displayed. The user can give a selection instruction for the second draw by specifying one attribute symbol in the updated selection image.

In the first embodiment, even after giving a selection instruction for the second draw in the state shown in FIG. 4(D), the user can further give a selection instruction. That is, after giving a selection instruction for the second draw, an acquisition image similar to the acquisition image 34 (FIG. 4(C)) described above is displayed on the display section 24 of the terminal device 2. If the user further gives a continue instruction while this acquisition image is displayed, the selection image is updated. This selection image includes three attribute symbols. The user can further give a selection instruction by specifying one of the three attribute symbols. Also after giving a selection instruction this time, an acquisition image and a selection image, which is displayed in response to a continue instruction given in the acquisition image, are displayed repeatedly. Thus, the user can give a selection instruction repeatedly.

As described above, in the first embodiment, also in the state in which a selection image representing the remaining selection candidate characters is displayed, the user can give a selection instruction by performing an operation of specifying an attribute symbol. That is, after the user selects one of the five attribute symbols displayed at first and acquires a character corresponding to the selected attribute symbol, the user can further acquire a character by selecting one (or more than one) of the remaining attribute symbols. In the first embodiment, the user can acquire a maximum of five characters in a single draw mode by repeatedly selecting attribute symbols as described above.

Note that when five selection instructions have been given (i.e., there are no choices left), the draw mode is ended. That is, when there are no choices chosen through a draw left, the terminal device 2 ends the draw mode even if there is no end instruction from the user.

If an end instruction is given while the acquisition image 34 is displayed (FIG. 4(C)), the terminal device 2 ends the draw mode. Thus, after a selection instruction for the first draw is given, the user can end the draw mode without further giving a selection instruction. That is, as shown in FIG. 4(C), after giving a selection instruction for the first draw, the end instruction image 35 is displayed and the user can thus give an end instruction. Therefore, in the first embodiment, when the user looks at the draw result (in other words, the attribute symbols included in the selection image) and thinks that the user is unlikely to acquire a desired character, the user can end the draw mode in progress without making the selection five times. For example, if the user wishes to make just one more selection instruction when a selection image is displayed, the user can give a selection instruction and then give an end instruction while the acquisition image is displayed.

Note that timing with which the end instruction image 35 is displayed may be any timing. For example, instead of displaying the end instruction image 35 together with the acquisition image 34, the end instruction image 35 may be displayed after the acquisition image 34 is displayed (e.g., after displaying the acquisition image 34 for a predetermined amount of time) or may be displayed together with the selection image shown in FIG. 4(D). Note that when the end instruction image 35 is displayed after the acquisition image 34 is displayed, the continue instruction image 36 and the notification image 37 are displayed together with the end instruction image 35. When the end instruction image 35 is displayed together with the selection image, the continue instruction image 36 and the notification image 37 may be displayed together with the acquisition image or may be displayed after the acquisition image is displayed (e.g., after displaying the acquisition image for a predetermined amount of time). When the end instruction image 35 is displayed together with the selection image, the continue instruction image 36 does not need to be displayed. In such a case, the end instruction image 35 and the notification image 37 may be displayed together with the selection image, after the acquisition image 34 is displayed.

On the other hand, the selection image for the first draw in the draw mode (FIG. 4(B)) does not include the end instruction image 35. That is, in the first embodiment, while the user is allowed to give a selection instruction for the first draw (FIG. 4(B)), the user cannot end the draw mode without giving a selection instruction. Thus, in the first embodiment, the user is required to select at least one of five selection candidate characters (in other words, attribute symbols) that have been chosen through a draw. Therefore, it can be said that orbs (specifically, ten orbs) consumed in response to the first draw instruction to be given in the draw mode are consumed in exchange for the right for one draw in the draw state.

As described above, in the first embodiment, orbs are consumed not when a selection instruction for the first draw is given ((B) of FIG. 4), but when a draw instruction is given ((A) of FIG. 4). Then, it is possible to discourage the user from starting over the draw after seeing a selection image representing the draw result ((B) of FIG. 4). Thus, it is possible to prevent the network traffic from increasing due to the user giving draw instructions over and over. It is also possible to prevent the draw from being too advantageous for the user.

In the first embodiment, each selection instruction for the second draw and thereafter in the draw mode is given in exchange for orbs. That is, in the first embodiment, each selection instruction for the second draw and thereafter is given on the condition that a predetermined number of orbs are consumed. Therefore, as shown in FIG. 4(C), an acquisition image that is displayed before a selection image for the second draw and thereafter is displayed includes the notification image 37 notifying of the need for nine orbs for a further selection instruction (in other words, summon). Thus, it is possible to let the user know that orbs are needed for each selection instruction for the second draw and thereafter. As shown in FIG. 4(C), the acquisition image 34 includes the user's orb count image 32 described above. Thus, it is possible to let the user know the number of orbs the user owns at the point.

Note that in the first embodiment, the user's orb count image 32 included in the selection image shown in FIG. 4(D) represents the number of orbs obtained by subtracting the number of orbs needed for a selection instruction from the number of orbs shown in FIG. 4(C). That is, in the first embodiment, the number of orbs is decreased in response to a continue instruction, and the number of orbs needed for a selection instruction is decreased before actually giving the selection instruction. Note however that the number of orbs may be decreased after giving the selection instruction in other embodiments.

In the first embodiment, the number of orbs consumed in exchange for a selection instruction for the second draw and thereafter is set to be smaller than that for the first draw. Specifically, in the first embodiment, the number of orbs consumed for a selection instruction is set based on the number of selection instructions, and it is ten for a selection instruction for the first draw, nine for a selection instruction for the second draw, nice for a selection instruction for the third draw, eight for a selection instruction for the fourth draw, and eight for a selection instruction for the fifth draw. Thus, the number of orbs needed for a selection instruction for the second draw and thereafter does not need to be the same as that for a selection instruction for the first draw. Note that in other embodiments, the number of orbs consumed in exchange for a selection instruction may be set so as to be decreased gradually based on the number of selection instructions. In other embodiments, the number of orbs needed for a selection instruction for the second draw and thereafter may be the same as that for a selection instruction for the first draw.

Then, the user can be motivated to give more selection instructions during one iteration of the draw state. According to the description above, the user can play the draw while employing one of the following two strategies: (a) ending the draw state and starting over the draw with the intention of achieving a better draw result; and (b) continuously giving selection instructions so as to conserve orbs. Thus, it is possible to enhance the strategic aspect of the draw and to improve the playability of the game.

[3. Processes Executed on Server 1 and Terminal Device 2] (3-1: General Process Flow on Information Processing System)

Figure 6:
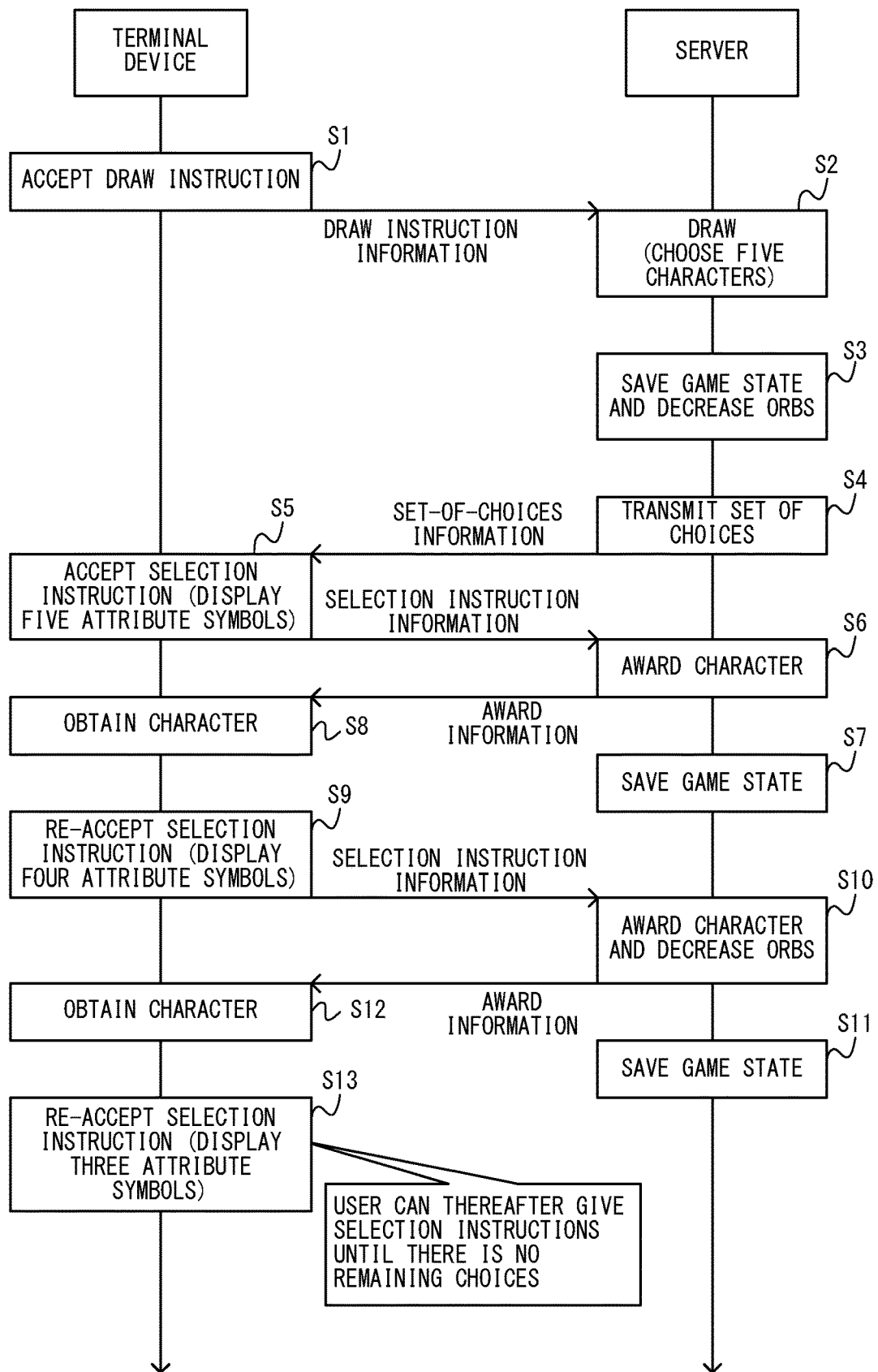
FIG. 6 is a diagram showing an example flow of a process to be executed by an information processing system in a draw mode.

FIG. 6 is a diagram showing an example flow of a process to be executed by the information processing system in the draw mode. In the process shown in FIG. 6, first, the terminal device 2 displays the draw instruction image 31 on the display section 24, and thereby accepts a draw instruction (step S1). The terminal device 2 transmits instruction information to the server 1 in response to a draw instruction being given (see FIG. 6). Note that instruction information is information representing various game-related instructions, and includes the content of the instruction and user identification information with which it is possible to identify the user (or the terminal device 2) related to the instruction. In step S1, instruction information representing a draw instruction (referred to as "draw instruction information") is transmitted from the terminal device 2 to the server 1.

Upon receiving the draw instruction information, the server 1 executes the operation of drawing a character (step S2). Herein, information of each character appearing in the game is stored in the server 1. The server 1 performs the draw of choosing a predetermined number ("initial candidate number", i.e., five) of characters from a pool of draw-object characters, i.e., characters that can be acquired through a draw.

Note that the specific method of drawing may be any method. For example, the server 1 stores therein information (character choice information to be described later) in which each draw-object character is associated with a numerical value representing the choice probability thereof. The server 1 uses a random number and performs the draw so that each draw-object character is selected with a probability based on this numerical value. Note that the numerical value may be expressed in percentage or may represent the degree of choice probability (e.g., the larger the numerical value is, the more likely the character is selected).

In the first embodiment, the server 1 chooses five selection candidate characters by executing, five times, the process of choosing one of draw-object characters. Note that the process of choosing one of draw-object characters may be similar to a conventional draw process. In the first embodiment, the same pool of draw-object characters is used for the five draws. That is, the server 1 perform the draw in a manner that does not prevent the same character from being chosen twice over the course of five draws. Note that in other embodiments, the server 1 may perform the draw in a manner that prevents the same character from being chosen twice over the course of five draws. Alternatively, the server 1 may alter the choice probability for characters that have already been chosen, over the course of five draws, so that such characters are less likely to be chosen again in the remaining draws. For example, when a rarity is assigned to each draw-object character (in other words, when the draw-object characters have different selection probabilities), the server 1 may perform the draw so that a high-rarity character (i.e., a character with a low choice probability) is chosen at least once over the course of five draws.

The server 1 saves the game state while the game is in the draw process (step S3). Herein, the server 1 stores information representing the game state (game state information to be described later) for each user. In step S3, the server 1 stores game state information indicating that the game is in the draw state, wherein the game state information is associated with the user. Note that the draw state refers to the game state from when the draw instruction is accepted until the draw mode is ended. The game state information representing the draw state includes information representing one or more selection candidate character at this point. In step S3, since five selection candidate characters are chosen in step S2, game state information including information representing the five selection candidate characters is stored. In the first embodiment, the server 1 saves the game state information representing the draw state so that even if the game is discontinued on the terminal device 2 during the draw state, the game can be resumed from the draw state, the details of which will be described later.

In step S3, the server 1 saves the game state and executes the process of decreasing the orbs owned by the user. Herein, the server 1 stores information representing the number of orbs owned by the user (orb count information to be described later). In response to receiving the draw instruction information, the server 1 updates the orb count information for the user so as to decrease the orb count by ten from the value before the update.

Moreover, the server 1 transmits, to the terminal device 2, set-of-choices information representing a predetermined number ("initial candidate number") of selection candidate characters chosen by a draw (step S4). The set-of-choices information is information representing a set of choices of characters that can be selected by the user. The server 1 also transmits, together with the set-of-choices information, orb count information representing the number of orbs having been decreased in step S3 to the terminal device 2.

Upon receiving the set-of-choices information from the server 1, the terminal device 2 displays the selection image on the display section 24, and thereby accepts a selection instruction (step S5). Then, the terminal device 2 receives the orb count information from the server 1, and synchronizes the orb count information stored in the terminal device 2 with the orb count information received from the server 1.

In step S5, in response to the user giving a selection instruction, the terminal device 2 transmits instruction information representing the selection instruction ("selection instruction information") to the server 1. The selection instruction information includes information representing the selected character.

Upon receiving the selection instruction information, the server 1 executes the process of awarding the character selected by the user to the user (step S6). Herein, the server 1 stores, for each user, information representing characters owned by the user (character ownership information to be described later). The server 1 updates the content of the character ownership information so that the character represented by the selection instruction information (i.e., the character selected by the user) is owned by the user. Moreover, the server 1 transmits, to the terminal device 2, award information indicating that the selected character is awarded to the user. The award information includes information related to the character awarded to the user (e.g., character identification information, information of various parameters assigned to the character, etc.).

After transmitting the award information, the server 1 updates the game state information (step S7). Specifically, the server 1 updates the game state information so that the game state information represents the remaining selection candidate character, excluding the character awarded to the user from the selection candidate characters represented by the game state information before the update (herein, five selection candidate characters). Therefore, in the first embodiment, even if the game is discontinued after a single draw is made in the draw state, the game can be resumed in the state in which the single draw has been made.

On the other hand, when the award information is received from the server 1, the terminal device 2 executes the process of obtaining the character identified by the award information (in other words, the character selected by the user in step S5) (step S8). Specifically, the terminal device 2 stores information related to the character included in the award information, and makes it available to the game program. Thus, the user is regarded to have acquired the character that the user has selected. The terminal device 2 displays the acquisition image 34 on the display section 24 (FIG. 4(C)). In the state in which the acquisition image 34 is displayed, the terminal device 2 accepts a continue instruction or an end instruction as described above.

Moreover, in response to the user giving a continue instruction, the terminal device 2 displays the selection image (FIG. 4(D)) including the attribute symbol 33 representing the attributes of the remaining, unselected selection candidate characters on the display section 24. That is, the terminal device 2 displays the selection image, and thereby accepts a selection instruction (i.e., a selection instruction for the second draw) (step S9). Note that although not shown in the figure, in response to the user giving a continue instruction, the terminal device 2 transmits instruction information representing the continue instruction (referred to as "continue instruction information") to the server 1.

Note that as described above, the user can give an end instruction by performing an operation of specifying the end instruction image 35, which is displayed together with the acquisition image. Although not shown in FIG. 6, when an end instruction is given, the terminal device 2 ends the draw mode. In this case, the terminal device 2 transmits, to the server 1, state notification information representing the game state after the transition from the draw state. The server 1, having received the state notification information, updates the game state information stored while being associated with the user of the terminal device 2 to another game state (e.g., the game state immediately before the transition to the draw mode). Thus, the end of the draw state is also managed on the server 1. Note that the game state to which the game transitions after the end of the draw mode may be any game state, e.g., the game state immediately before the draw mode or a predetermined game state (e.g., a state in which the main menu screen is displayed).

When the user gives a selection instruction for the second draw, the process of awarding the selected character to the user is executed, as with a selection instruction for the first draw. That is, when a selection instruction is given in step S9, the terminal device 2 transmits the selection instruction information to the server 1, as in the process of step S5. Upon receiving the selection instruction information, the server 1 executes the process of awarding the character selected by the user to the user (step S10), as in the process of step S6, and saves the game state information (step S11), as in the process of step S7. Note that in step S11, the game state information is updated so as to represent the remaining three characters. The terminal device 2 executes the process of obtaining the awarded character (step S12), as in the process of step S8.

Note that when a selection instruction for the second draw and thereafter is given, the server 1 executes the process of decreasing the orbs owned by the user. For example, in step S10 described above, the server 1 executes the process of decreasing the orbs owned by the user, as in the process of step S3 described above, and transmits the orb count information representing the number of orbs having been decreased to the terminal device 2, as in the process of step S4 described above. Then, the terminal device 2 synchronizes the orb count information stored in the terminal device 2 with the orb count information received from the server 1, as in the process of step S5 described above.

After the character is awarded to the user in response to the selection instruction for the second draw, if the user gives a continue instruction while the acquisition image is displayed, the terminal device 2 displays the selection image and thereby accepts a selection instruction for the third draw (step S13). The flow of the process executed when a selection instruction for the third draw and thereafter is given is the same as the flow of the process executed when a selection instruction for the second draw is given. Note that when a selection instruction for the fifth draw is given, the server 1 and the terminal device 2 execute the process of ending the draw mode, as in the case in which an end instruction is given.

Figure 7:
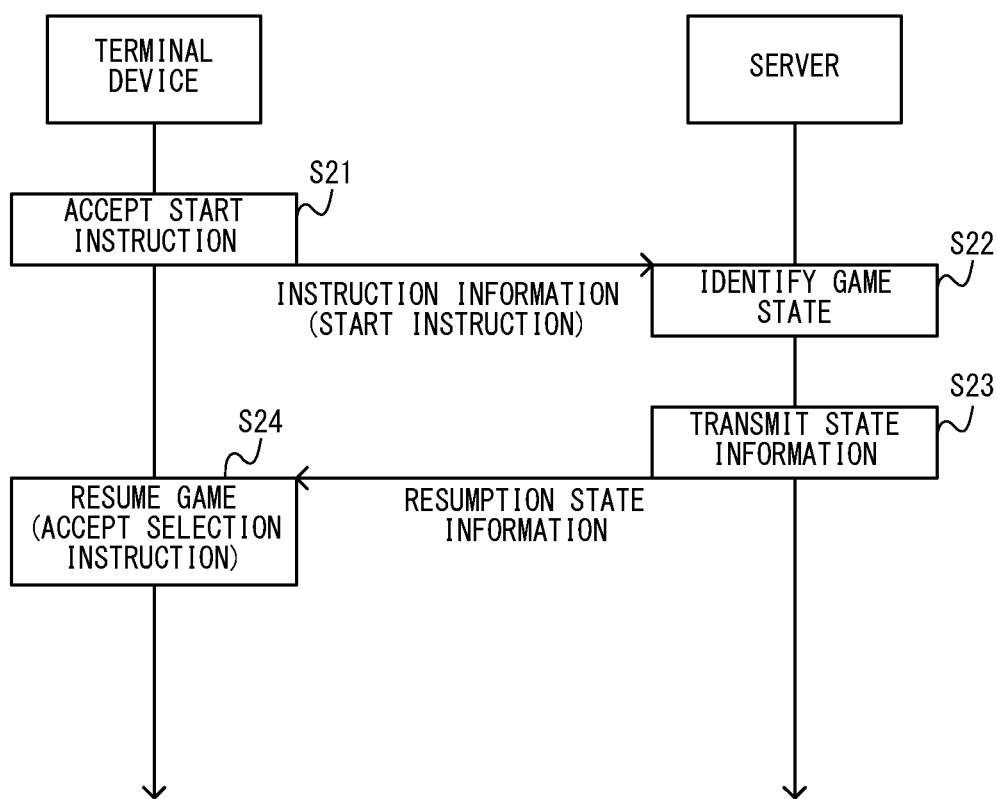
FIG. 7 is a diagram showing an example flow of a process to be executed by an information processing system when resuming a game application.

FIG. 7 is a diagram showing an example flow of a process to be executed by the information processing system when resuming the game application. Note that FIG. 7 shows the flow of the process of resuming the game, which has been discontinued while the game state was the draw state.

In FIG. 7, first, the terminal device 2 accepts an instruction to start the game (referred to as "start instruction") (step S21). The start instruction may be an instruction to launch the game application, for example, an instruction to specifying the start button image, for example, after the launch, or an instruction to perform a login to the game application (specifically, a login to the service provided by the server 1). In response to accepting the start instruction from the user, the terminal device 2 transmits instruction information representing the start instruction (referred to as "start instruction information") to the server 1 (see FIG. 7).

Upon receiving the start instruction information, the server 1 identifies the game state of the game related to the start instruction (step S22). That is, the server 1 identifies the game state based on the game state information stored in the server 1. Herein, when the game state information represents the draw state, the server 1 identifies that the game state of the game related to the start instruction is the draw state. In such a case, the server 1 transmits resumption state information representing the draw state to the terminal device 2 (step S23). Note that the resumption state information is information representing the game state at resumption of the game. The resumption state information representing the draw state includes information representing selection candidate characters that can be selected in the draw state.

Upon receiving the resumption state information representing the draw state, the terminal device 2 resumes the game using the resumption state information (step S24). Specifically, the terminal device 2 displays the selection image including the attribute symbols of the selection candidate characters on the display section 24, by using information representing the selection candidate characters included in the resumption state information. Thus, the user can resume the game in the draw state as before the discontinuation (in other words, a state in which the user can give a selection instruction).

Note that although not shown in the figures, when the game state information stored in the server 1 represents a game state different from the draw state, the server 1 transmits resumption state information representing the game state to the terminal device 2. The terminal device 2 resumes the game based on the received resumption state information. For example, when the game was discontinued in a battle state, the server 1 transmits resumption state information representing the battle state to the terminal device 2, and the terminal device 2 resumes the game in the battle state by using the resumption state information.

As described above, in the first embodiment, the server 1 saves the game state information representing the draw state (steps S3, S7, S11). Then, when resuming the game, the server 1 identifies the game state at resumption by using the saved game state information (step S22). Therefore, even when the game application is discontinued in the draw state on the terminal device 2, and then the terminal device 2 resumes the game application, the server 1 can cause the terminal device 2 to resume the game in the draw state. Then, after the game is discontinued due to an interruption of communication between the terminal device 2 and the server 1 after a number of draws have been performed in the draw state, for example, the user can continue to draw in the draw state at resumption. Moreover, it is possible to prevent the user from intentionally discontinuing the game application after the draw has been performed a number of times in the draw state in order to start over the draw process, for example.

(3-2: Example Process on Server)

Figure 8:
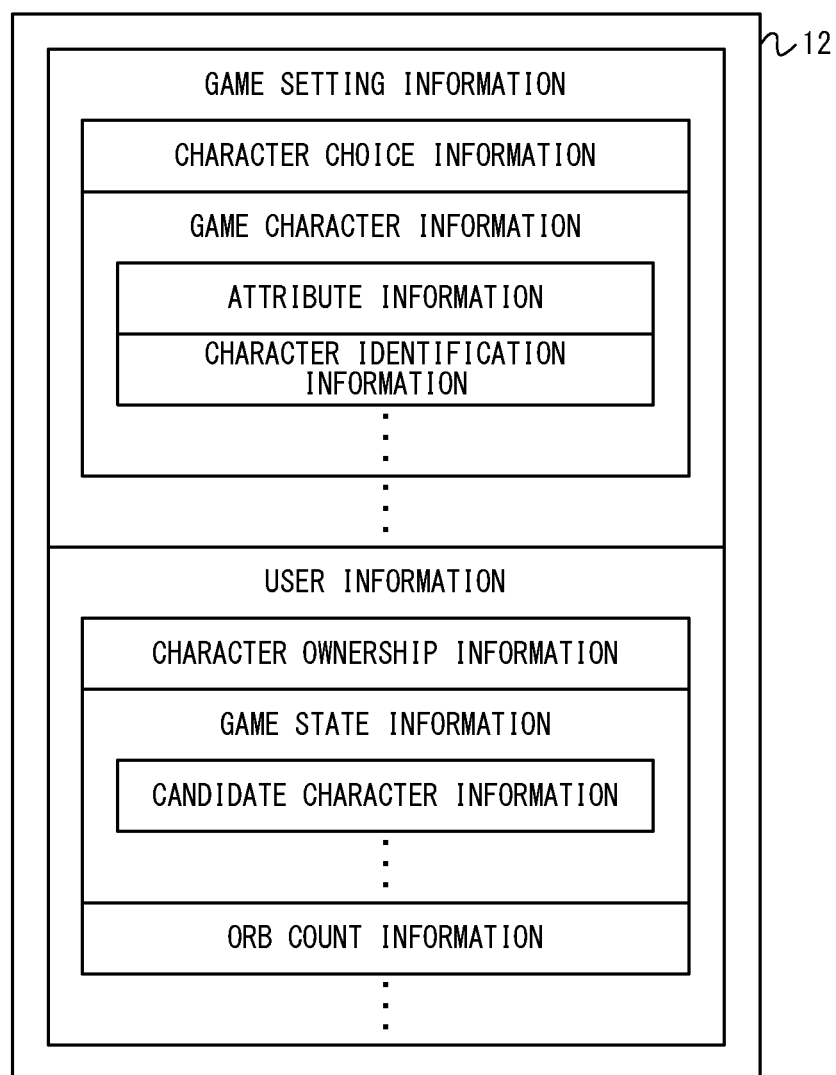
FIG. 8 is a diagram showing an example of various information to be used in processes executed on a server.

Next, an example process to be executed on the server 1 will be described. FIG. 8 is a diagram showing an example of various information to be used in processes executed on the server 1. The various information shown in FIG. 8 are stored in the storage section 12 of the server 1, for example.

The storage section 12 stores game setting information, which is information related to game settings (the content of the game). In the first embodiment, the game setting information includes character choice information and game character information. The game setting information may include any information to be used in the game process in addition to the information shown in FIG. 8. The character choice information is information in which each draw-object character is associated with a numerical value representing the choice probability thereof as described above.

The game character information is information related to characters appearing in the game (including the draw-object characters). In the first embodiment, the game character information includes, for each character, character identification information and attribute information. The character identification information is information (e.g., an identification number) assigned to each character so that the character can be identified. The attribute information represents the attribute assigned to the character. The attribute information of each character is stored while being associated with the character (in other words, with the character identification information).

The storage section 12 stores user information for each user. The user information is information related to users who are registered as recipients of services (game-related services in the first embodiment) provided by the server 1.

The user information includes character ownership information. The character ownership information represents characters owned by the user. For example, the character ownership information includes identification information of each character owned by the user.

The user information includes the game state information. The game state information represents the (current) state of the game being played by the user. As described above, when the game state information represents the draw state, the game state information includes candidate character information. The candidate character information represents the current selection candidate characters, and specifically includes identification information of each selection candidate character.

The user information includes the orb count information. The orb count information represents the number of orbs currently owned by the user.

Figure 9:
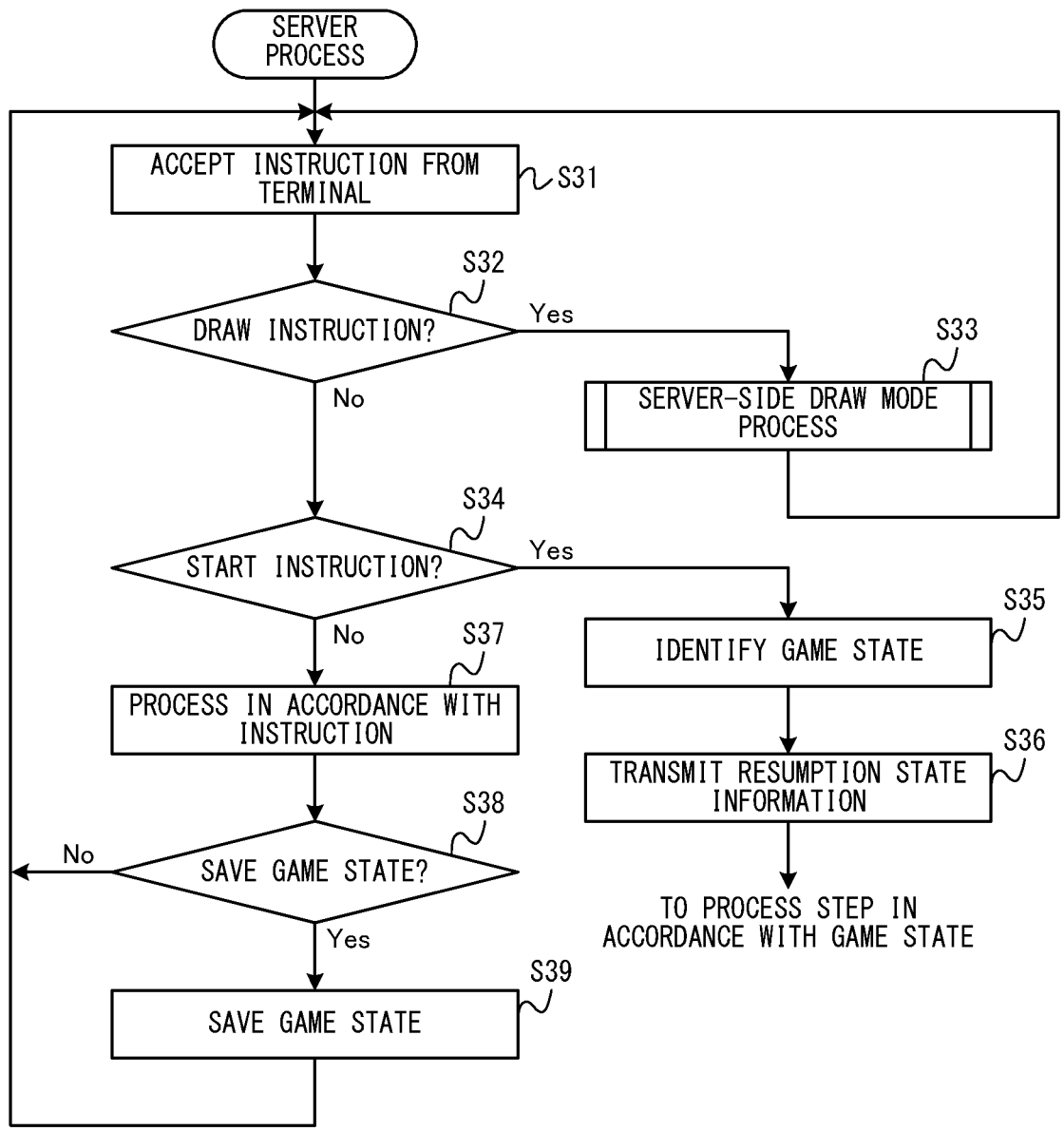
FIG. 9 is a flow chart showing an example flow of a process on a server.

FIG. 9 is a flow chart showing an example flow of a process on the server 1 (hereinafter referred to as a "server process"). Note that the series of steps shown in FIG. 9 is executed continuously during the operation of the server 1. Note that while the first embodiment is described assuming that the processing section 11 (specifically, the CPU) of the server 1 executes the steps shown in FIG. 9 (and FIG. 10), some of the steps in the flow chart may be executed by a processor other than the CPU or a dedicated circuit.

The steps in the flow chart shown in FIG. 9 (this also applies to the flow charts of FIG. 10, FIG. 12 and FIG. 13 to be discussed later) are merely illustrative, and the order of steps may be switched around as long as similar results are obtained, and other steps may be executed in addition to (or instead of) these steps.

In step S31, the processing section 11 accepts an instruction from the terminal device 2. That is, the processing section 11 checks whether or not there is instruction information received by the communication section 13 from the terminal device 2, and if there is instruction information received, the processing section 11 receives the instruction information from the communication section 13. Following step S31, the process of step S32 is executed.

In step S32, the processing section 11 determines whether or not the instruction received in step S31 is a draw instruction. That is, the processing section 11 determines whether or not instruction information received from the communication section 13 represents a draw instruction. If the determination result of step S32 is affirmative, the process of step S33 is executed. On the other hand, if the determination result of step S32 is negative, the process of step S34 to be described later is executed.

In step S33, the processing section 11 executes a server-side draw mode process. The server-side draw mode process is a process executed by the server 1 in the draw mode described above. The details of the server-side draw mode process will now be described with reference to FIG. 10.

Figure 10:
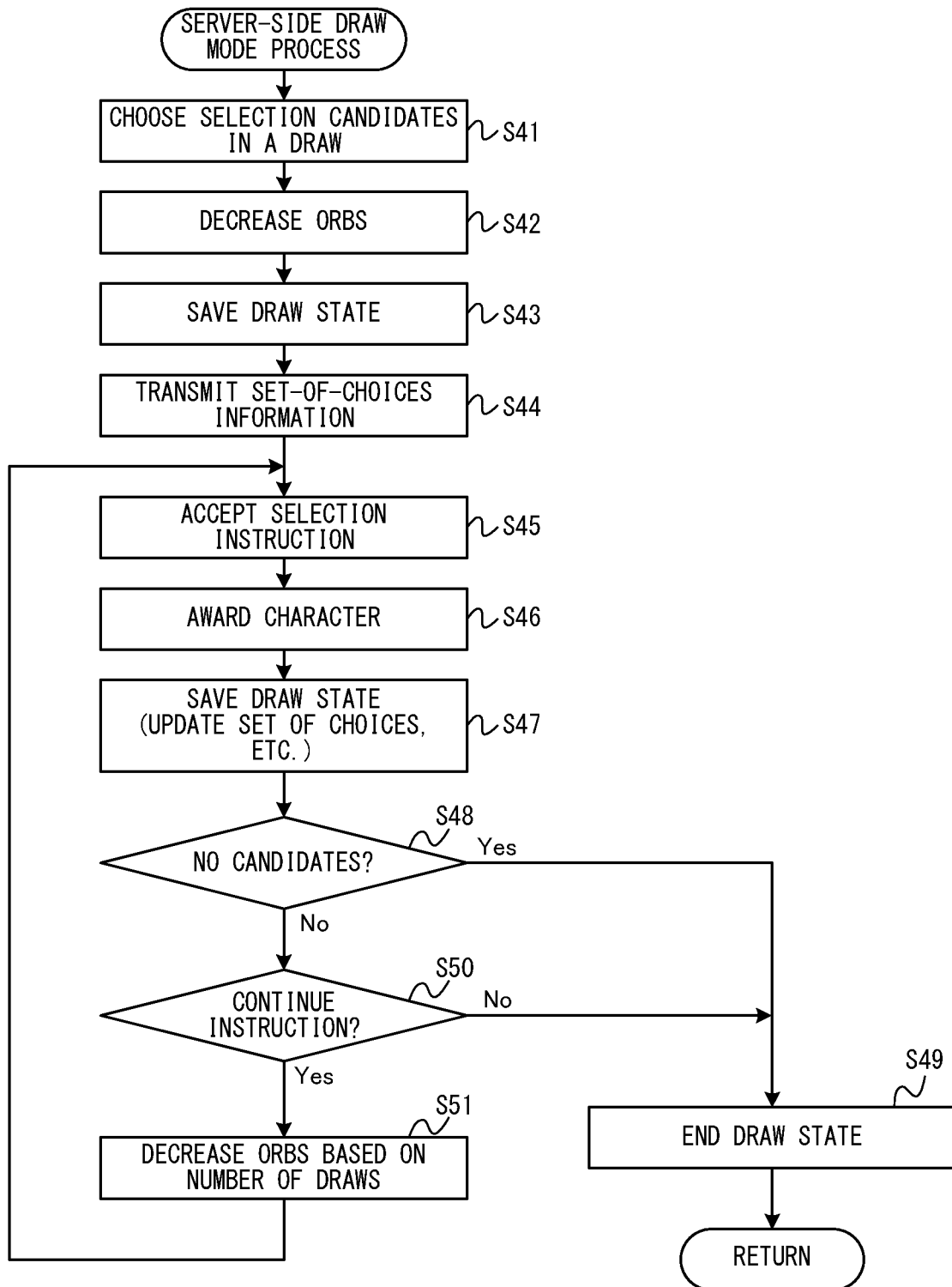
FIG. 10 is a sub-flow chart showing an example detailed flow of a server-side draw mode process of step S33 shown in FIG. 9.

FIG. 10 is a sub-flow chart showing an example detailed flow of the server-side draw mode process of step S33 shown in FIG. 9. In the server-side draw mode process, first, in step S41, the processing section 11 performs the draw of choosing a predetermined number ("initial candidate number", which is five) of characters from a pool of draw-object characters (step S2 shown in FIG. 6). That is, the processing section 11 performs the draw based on the character choice information stored in the storage section 12, and stores the character identification information, representing the characters chosen by a draw (i.e., the selection candidate characters), in a memory or the storage section 12. Note that the draw is performed by the method described above in the process of step S2. Following step S41, the process of step S42 is executed.

In step S42, the processing section 11 decreases orbs owned by the user (step S3 shown in FIG. 6). Specifically, the processing section 11 updates the orb count information included in the user information stored in the storage section 12 to a value obtained by subtracting a predetermined number (herein, ten) from the value before the update. Note that the user information updated in step S42 is user information related to the user who gave the instruction accepted in step S31 (i.e., the user represented by the user identification information included in the received instruction information). Following step S42, the process of step S43 is executed.

In step S43, the processing section 11 saves the current draw state (step S3 shown in FIG. 6). That is, the processing section 11 stores, in the storage section 12, game instruction information that is the game state information representing the draw state and that includes the character identification information representing the characters chosen in step S41. Following step S43, the process of step S44 is executed.

In step S44, the processing section 11 transmits, to the terminal device 2, set-of-choices information representing a set of choices, which is composed of the selection candidate characters chosen in step S41 (step S4 shown in FIG. 6). That is, the processing section 11 generates set-of-choices information including the character identification information stored in the memory or the storage section 12 in step S41 (i.e., the character identification information representing the selection candidate characters). Moreover, the processing section 11 transmits the set-of-choices information to the terminal device 2 via the communication section 13 (in other words, using the communication section 13). Note that the terminal device 2 to which the set-of-choices information is transmitted is the terminal device 2 that transmitted the instruction information received in step S31. In the first embodiment, the processing section 11 transmits, together with the set-of-choices information, the orb count information after being updated in step S42 to the terminal device 2. Following step S44, the process of step S45 is executed.

When the set-of-choices information is received by the terminal device 2, the terminal device 2 displays the selection image and accepts a selection instruction as described above (step S5 shown in FIG. 6). Then, when a selection instruction is accepted, the terminal device 2 transmits the selection instruction information to the server 1.

In step S45, the processing section 11 accepts a selection instruction from the terminal device 2. That is, the processing section 11 checks whether or not the selection instruction information from the terminal device 2 has been received by the communication section 13, and if there is selection instruction information received, the processing section 11 receives the selection instruction information from the communication section 13. In step S45, a selection instruction is accepted, the process of step S46 is executed.

In step S46, the processing section 11 awards the user with the selection candidate character associated with the selection instruction accepted in step S45 (step S6 shown in FIG. 6). That is, the processing section 11 updates the character ownership information included in the user information stored in the storage section 12 so that the character identification information of the selection candidate character associated with the selection instruction is included. Note that the user information updated in step S46 (and step S47 to be described later) is user information related to the user who gave the selection instruction accepted in step S45 (i.e., the user represented by user identification information included in the received instruction information). Moreover, the processing section 11 transmits the award information to the terminal device 2 via the communication section 13. That is, the processing section 11 transmits, to the terminal device 2, the award information including the character identification information related to the selection candidate character associated with the selection instruction and information of various parameters assigned to the character. When the process of step S46 is executed after step S51 to be described later, the processing section 11 transmits, together with the award information, the orb count information after being updated in step S51 to the terminal device 2 via the communication section 13. Following step S46, the process of step S47 is executed.

In step S47, the processing section 11 saves the current draw state (in other words, the game state) (step S8 shown in FIG. 6). That is, the processing section 11 deletes the character awarded to the user in step S46 from the set of selection candidate characters represented by the candidate character information included in game state information stored in the storage section 12. In other words, the processing section 11 updates the candidate character information so that the candidate character information represents the remaining selection candidate characters excluding the deleted character. Following step S47, the process of step S48 is executed.

In step S48, the processing section 11 determines whether or not there is no longer a selection candidate character left (i.e., whether the selection candidate characters chosen by a draw have all been awarded). For example, the determination can be made based on whether the candidate character information after being updated in step S47 represents no selection candidate character (in other words, there is no selection candidate character represented by the candidate character information stored in the storage section 12). If the determination result of step S48 is affirmative, the process of step S49 is executed. On the other hand, if the determination result of step S48 is negative, the process of step S50 to be described later is executed.

In step S49, the processing section 11 ends the draw state (in other words, the draw mode). Herein, when the draw state is ended on the terminal device 2, the terminal device 2 transmits, to the server 1, the state notification information representing the game state after the transition from the draw state (step S88 to be described later). In step S49, the processing section 11 receives the state notification information via the communication section 13, and updates the game state information stored in the storage section 12 based on the received state notification information. Specifically, the processing section 11 updates the game state information stored in the storage section 12 from the draw state to the game state represented by the state notification information. After the process of step S49, the processing section 11 ends the server-side draw mode process.

On the other hand, in step S50, the processing section 11 determines whether or not a continue instruction has been accepted. Herein, after the award information is transmitted to the terminal device 2 by the process of step S46 described above, the acquisition image is displayed on the terminal device 2 (step S8 shown in FIG. 6), and a continue instruction or an end instruction is accepted (FIG. 4(C)). Then, when an end instruction is given by the user while the acquisition image is displayed, the terminal device 2 transmits the state notification information to the server 1 (step S89 to be described later). When a continue instruction is given by the user in the state described above, the terminal device 2 transmits the continue instruction information to the server 1. In step S50, when the continue instruction information is received by the communication section 13, the processing section 11 determines that a continue instruction has been accepted, whereas when the state notification information is received by the communication section 13, the processing section 11 determines that no continue instruction has been accepted (i.e., an end instruction has been accepted). If the determination result of step S50 is affirmative, the process of step S49 described above is executed, and then the server-side draw mode process is ended. On the other hand, if the determination result of step S50 is negative, the process of step SM is executed.

In step S51, the processing section 11 decreases orbs owned by the user (step S10 shown in FIG. 6). Specifically, the processing section 11 updates the orb count information included in the user information stored in the storage section 12 to a value obtained by subtracting the number of orbs, which is set based on the number of selection instructions, from the value before the update. The processing section 11 transmits the updated orb count information to the terminal device 2 via the communication section. After the process of step S51, the process of step S45 is executed again. Thereafter, the processing section 11 repeatedly executes the series of steps S45 to S51 until the draw state is ended (i.e., until the determination result of step S48 is affirmative or the determination result of step S50 is negative). The server-side draw mode process is as described above.

Referring back to FIG. 9, when the server-side draw mode process of step S33 ends, the processing section 11 executes the process of step S31 again.

On the other hand, in step S34, the processing section 11 determines whether or not the instruction received in step S31 is a start instruction. That is, the processing section 11 determines whether or not the instruction information received from the communication section 13 represents a start instruction. If the determination result of step S34 is affirmative, the process of step S35 is executed. On the other hand, if the determination result of step S34 is negative, the process of step S37 to be described later is executed.

In step S35, the processing section 11 identifies the game state with reference to the game state information included in the user information stored in the storage section 12. Note that the user information including the game state information referred to in step S35 is user information related to the user who gave the instruction accepted in step S31. Following step S35, the process of step S36 is executed.

In step S36, the processing section 11 generates resumption state information representing the game state identified in step S35, and transmits the resumption state information to the terminal device 2 via the communication section 13. After the process of step S36, the processing section 11 starts (in other words, resumes) the game process, starting from the process according to the game state identified in step S35. For example, when the game state identified in step S35 is the draw state, the processing section 11 executes the process of step S45 or S50 following step S36. Specifically, if it is a draw state in which there are five selection candidate characters, the processing section 11 executes the process of step S45 following step S36, and if it is a draw state in which there are four or less selection candidate characters, the processing section 11 executes the process of step S50 following step S36.

On the other hand, in step S37, the processing section 11 executes the game process in accordance with the instruction received in step S31. There is no limitation on the game process executed in step S37. For example, if there is a game process that should be executed on the server 1 when the game process of step S67 to be described later is executed on the terminal device 2, the terminal device 2 transmits instruction information to request (in other words, instruct) the server 1 to execute the process. Then, the processing section 11 executes the game process in accordance with the received instruction information as the game process in step S37, and transmits the result of execution to the terminal device 2. Following step S37, the process of step S38 is executed.

Herein, in the first embodiment, in step S37 described above, the processing section 11 executes the process of increasing the orbs in response to a purchase instruction to purchase orbs. In the first embodiment, the terminal device 2 accepts, in the game, a purchase instruction to purchase orbs, specifying the number of orbs to be purchased (step S67 to be described later). Note that the terminal device 2 may accept a purchase instruction at any point in time. For example, the terminal device 2 may accept a purchase instruction on the main menu screen. When the user gives a purchase instruction, the terminal device 2 transmits instruction information representing the purchase instruction (referred to as "purchase instruction information") to the server 1. The purchase instruction information includes information representing the number of orbs to be purchased.

In step S37 described above, the processing section 11 determines whether or not the instruction received in step S31 is a purchase instruction. That is, the processing section 11 determines whether or not the instruction information received from the communication section 13 is a purchase instruction. When the received instruction is a purchase instruction, the processing section 11 updates the orb count information included in the user information stored in the storage section 12 to a value obtained by adding the number of orbs associated with the purchase instruction (i.e., the number of orbs represented by the purchase instruction information) to the value before the update. The number of orbs is increased on the condition that it is charged. That is, when updating the orb count information as described above, the processing section 11 executes a charging process for the purchase of orbs. Note that as described above, the method of charging may be similar to conventional methods, and the process of charging may also be similar to conventional processes.

In step S38, the processing section 11 determines whether or not to save the game state. Herein, the terminal device 2 transmits the state notification information representing the current game state to the server 1 at an appropriate point in time (e.g., when transmitting instruction information or when changing the game state) while the game process is executed. In step S38, the processing section 11 determines whether or not the state notification information has been received by the communication section 13. If the determination result of step S38 is affirmative, the process of step S39 is executed. On the other hand, if the determination result of step S38 is negative, the process of step S31 is performed again.

In step S39, the processing section 11 saves the current game state. That is, the processing section 11 updates the game state information included in the user information stored in the storage section 12 so that the game state information represents the game state represented by the state notification information received in step S38. Note that the state notification information includes user identification information of the user playing the game. The user information updated in step S38 is user information related to the user represented by the user identification information included in the state notification information accepted in step S38. Following step S39, the process of step S31 is executed again.

The processing section 11 repeatedly executes the series of steps S31 to S39 described above. Note that when the server 1 is accessed by a plurality of terminal devices 2, the processing section 11 executes the series of steps in parallel for the users.

(3-3: Example Process on Terminal Device)

Figure 11:
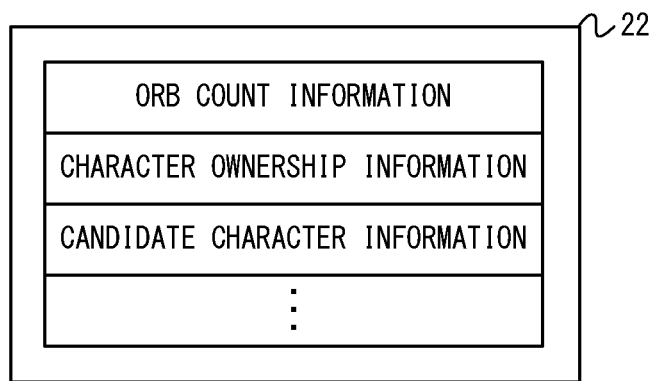
FIG. 11 is a diagram showing an example of various information to be used in processes executed on a terminal device.

Next, an example process executed on the terminal device 2 will be described. FIG. 11 is a diagram showing an example of various information to be used in processes executed on the terminal device 2. The various information shown in FIG. 11 are stored in the storage section 22 of the terminal device 2, for example.

As shown in FIG. 11, the storage section 22 stores information similar to the orb count information and the character ownership information stored in the server 1. When the number of orbs is displayed on the terminal device 2, the value represented by the orb count information stored in the storage section 22 is displayed as the number of orbs. The orb count information stored in the storage section 22 is updated so as to be synchronized with the orb count information stored in the server 1, and the character ownership information stored in the storage section 22 is updated so as to be synchronized with the character ownership information stored in the server 1, the details of which will be described later.

The storage section 22 stores the candidate character information. The candidate character information is stored in the draw state, and represents the current selection candidate characters in the draw state.

Figure 12:
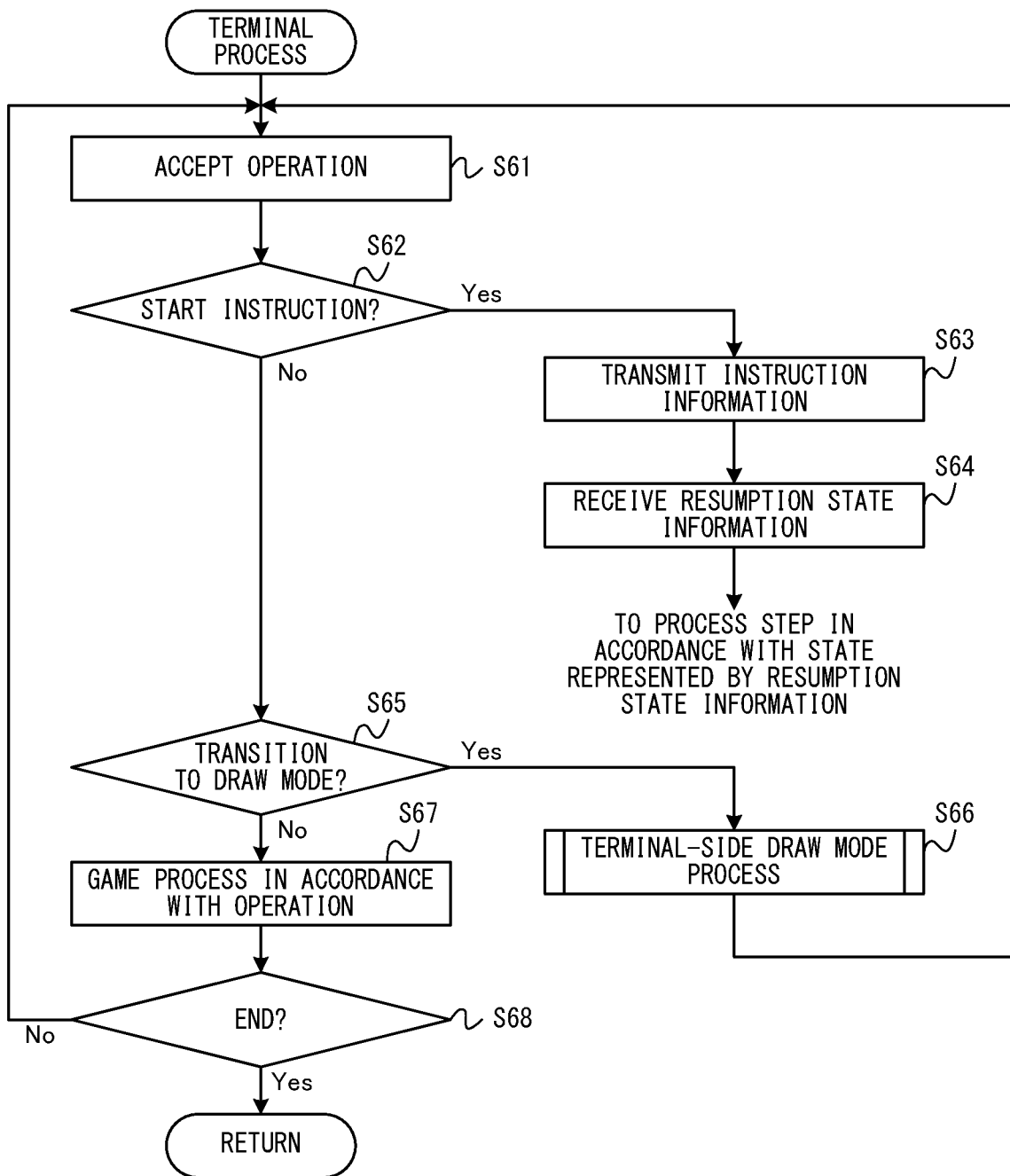
FIG. 12 is a flow chart showing an example flow of a process on a terminal device.

FIG. 12 is a flow chart showing an example flow of a process on the terminal device 2 (referred to as a "terminal process"). The series of steps shown in FIG. 12 is started in response to the start of execution of the program of the game application on the terminal device 2. Note that while the first embodiment is described assuming that the processing section 21 (specifically, the CPU) of the terminal device 2 executes the steps shown in FIG. 12 (and FIG. 13), some of the steps in the flow chart may be executed by a processor other than the CPU or a dedicated circuit.

In step S61, the processing section 21 accepts operations by the user for giving various instructions to the terminal device 2. That is, the processing section 21 obtains, from the input section 23, input information representing the input on the input section 23. Note that operations that can be performed by the user may vary depending on the game state or the game status. For example, in the draw state, depending on the status, operations for giving a draw instruction, a selection instruction and an end instruction are possible and these operations are accepted as necessary. For example, when the game application is launched, a start instruction can be given, and an operation for giving a start instruction is accepted. Following step S61, the process of step S62 is executed.

In step S62, the processing section 21 determines whether or not the operation accepted in step S61 is an operation of giving a start instruction. That is, the processing section 21 determines whether or not an operation of giving a start instruction has been performed based on the input information obtained in step S61. If the determination result of step S62 is affirmative, the process of step S63 is executed. On the other hand, if the determination result of step S62 is negative, the process of step S65 to be described later is executed.

In step S63, the processing section 21 transmits the start instruction information. That is, the processing section 21 generates instruction information that represents a start instruction and includes the user identification information, and transmits the instruction information to the server 1 via the communication section 25 (in other words, using the communication section 25). Following step S63, the process of step S64 is executed. Note that as described above, the server 1, having received the start instruction information, transmits the resumption state information to the terminal device 2 (step S36 shown in FIG. 9).

In step S64, the processing section 21 receives, via the communication section 25, the resumption state information transmitted from the server 1. Moreover, the processing section 21 identifies the game state at resumption based on the received resumption state information, and resumes the game in the identified game state. For example, when the resumption state information represents the draw state, the processing section 21 resumes the process starting from step S85 to be described later.

On the other hand, in step S65, the processing section 21 determines whether or not to transition to the draw mode. That is, the processing section 21 determines whether or not an operation of giving the switching instruction described above for transitioning to the draw mode has been performed based on the input information obtained in step S61. If the determination result of step S65 is affirmative, the process of step S66 is executed. On the other hand, if the determination result of step S65 is negative, the process of step S67 to be described later is executed.

Figure 13:
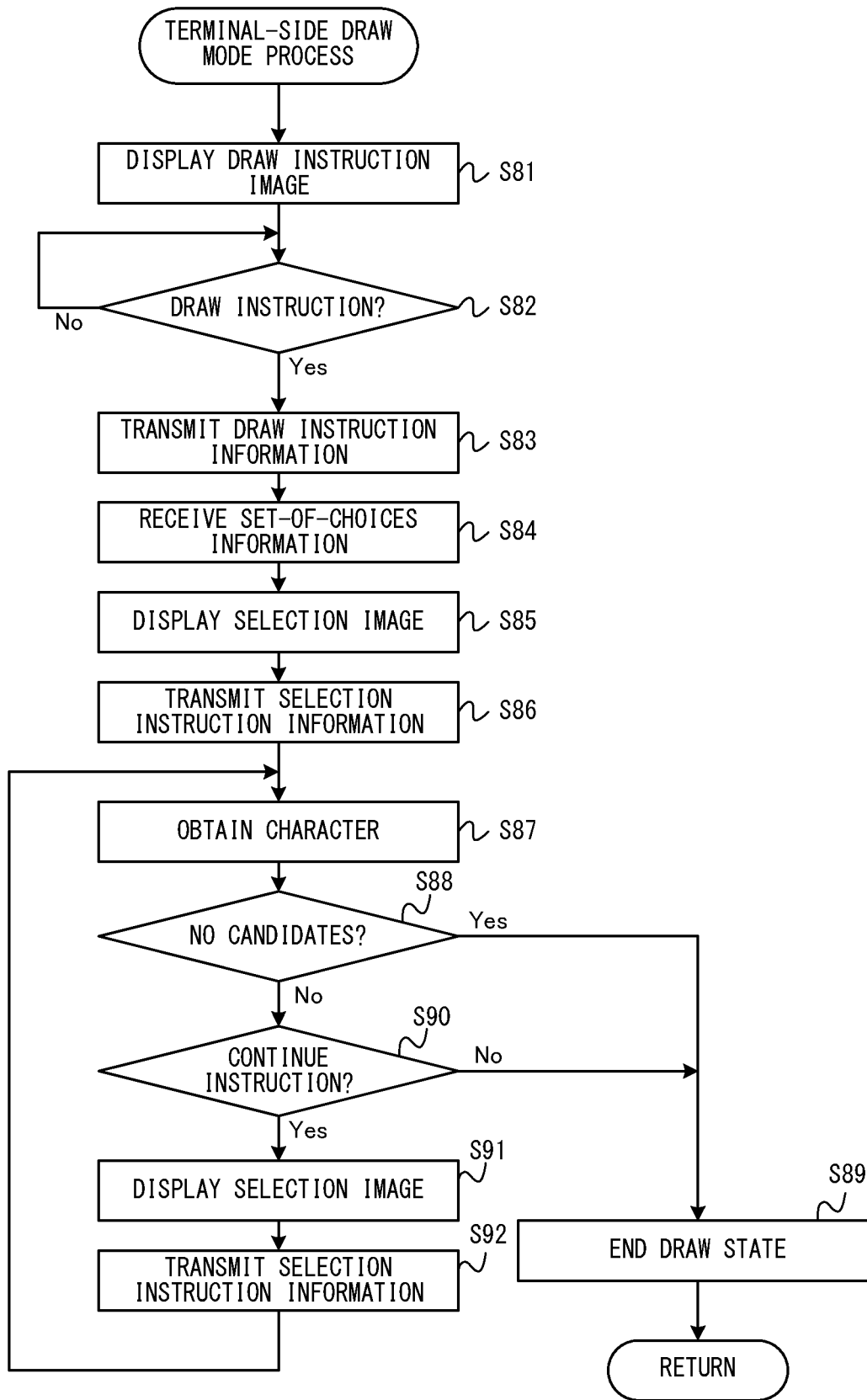
FIG. 13 is a sub-flow chart showing an example detailed flow of a terminal-side draw mode process of step S66 shown in FIG. 12.

In step S66, the processing section 21 executes a terminal-side draw mode process. The terminal-side draw mode process is a process executed by the terminal device 2 in the draw mode described above. Referring to FIG. 13, the details of the terminal-side draw mode process will now be described.

FIG. 13 is a sub-flow chart showing an example detailed flow of the terminal-side draw mode process of step S66 shown in FIG. 12. In the terminal-side draw mode process, first, in step S81, the processing section 21 displays the draw instruction image 31 on the display section 24 (FIG. 4(A)). Thus, the processing section 21 can accept a draw instruction from the user. Following step S81, the process of step S82 is executed.

In step S82, the processing section 21 determines whether or not a draw instruction has been given. That is, the processing section 21 obtains input information from the input section 23, and determines whether or not an operation of giving a draw instruction (i.e., an operation of touching the draw instruction image 31) has been performed based on the obtained input information. If the determination result of step S82 is affirmative, the process of step S83 is executed. On the other hand, if the determination result of step S82 is negative, the process of step S82 is executed again. Note that the process of step S82 is executed repeatedly at a rate of once per a predetermined amount of time, for example.

In step S83, the processing section 21 transmits the draw instruction information to the server 1. That is, the processing section 21 generates instruction information that represents a draw instruction and includes the user identification information, and transmits the instruction information to the server 1 via the communication section 25. Following step S83, the process of step S84 is executed. Note that as described above, in response to the draw instruction, the server 1 draws from a pool of draw-object characters, and transmits the set-of-choices information, which is the draw result, and the orb count information to the terminal device 2 (steps S41 to S44).

In step S84, the processing section 21 receives, via the communication section 25, the set-of-choices information and the orb count information transmitted from the server 1. Then, the processing section 21 stores the character identification information included in the received set-of-choices information as the candidate character information in the storage section 22. The processing section 21 updates the orb count information stored in the storage section 22 so that the number of orbs is equal to that represented by the received orb count information. Following step S84, the process of step S85 is executed.

In step S85, the processing section 21 displays the selection image on the display section 24 (FIG. 4(B)). Thus, the processing section 21 can accept a selection instruction from the user. Specifically, the processing section 21 refers to the candidate character information stored in the storage section 22 to generate a selection image including attribute symbols representing one or more characters represented by the candidate character information, and displays the selection image on the display section 24. Following step S85, the process of step S86 is executed.

In step S86, the processing section 21 transmits the selection instruction information to the server 1 in response to a selection instruction from the user. That is, the processing section 21 obtains input information from the input section 23 to determine whether or not an operation of giving a selection instruction (i.e., an operation of touching the attribute symbol 33) has been performed based on the obtained input information. When an operation of giving a selection instruction has been performed, the processing section 21 generates instruction information that represents a selection instruction and includes character identification information, which represents a selection candidate character associated with the selection instruction, and the user identification information. The processing section 21 transmits the generated instruction information to the server 1 via the communication section 25. Note that in the process of step S86, the processing section 21 stands by until a selection instruction is given. Following step S86, the process of step S87 is executed. Note that as described above, in response to the selection instruction, the server 1 transmits, to the terminal device 2, award information (the award information and the orb count information in some cases) related to the selection candidate character associated with the selection instruction (step S46 shown in FIG. 10).

In step S87, the processing section 21 executes a process of obtaining a character associated with the selection instruction. That is, the processing section 21 first receives, via the communication section 25, the award information (the award information and the orb count information in some cases) transmitted from the server 1. Then, the processing section 21 generates an acquisition image representing the character represented by the award information, and displays the generated acquisition image on the display section 24 (FIG. 4(C)). Thus, the processing section 21 can accept a continue instruction or an end instruction described above. The processing section 21 updates the content of the character ownership information so that the user owns the character that is identified by the award information. Then, the processing section 21 stores information related to this character included in the award information (i.e., information of the various parameters assigned to the character, etc.) in the storage section 22, and makes the information available to the game program. The processing section 21 updates the candidate character information stored in the storage section 22 so as to delete the character identification information of the character represented by the award information. Following step S87, the process of step S88 is executed.

In step S88, the processing section 21 determines whether or not there is no longer a selection candidate character left. The processing section 21 makes the determination by referring to the candidate character information stored in the storage section 22. That is, the processing section 21 determines whether or not the candidate character information represents no selection candidate character (in other words, the number of selection candidate characters represented by the candidate character information is zero). If the determination result of step S88 is negative, the process of step S90 to be described later is executed. On the other hand, if the determination result of step S88 is affirmative, the process of step S89 is executed.

In step S89, the processing section 21 ends the draw state and transitions to another game state. The processing section 21 transmits the state notification information representing the game state after the transition from the draw state to the server 1 via the communication section 25. When the state notification information is received by the server 1, the game state information is updated on the server 1 (step S49 shown in FIG. 10). After the process of step S89, the processing section 21 ends the terminal-side draw mode process.

On the other hand, in step S90, the processing section 21 determines whether or not a continue instruction has been given. That is, the processing section 21 obtains input information from the input section 23 to determine, based on the obtained input information, whether an operation of giving a continue instruction (i.e., an operation of touching the continue instruction image 36) has been performed or an operation of giving an end instruction (i.e., an operation of touching the end instruction image 35) has been performed. If the determination result of step S90 is affirmative, the process of step S91 is executed. On the other hand, if the determination result of step S90 is negative, (i.e., an operation of giving an end instruction has been performed), the process of step S89 described above is executed again. Note that in the process of step S90, the processing section 21 stands by until either a selection instruction or an end instruction is given.

In step S91, the processing section 21 displays the selection image on the display section 24 (FIG. 4(D)). The process of step S91 is similar to the process of step S85 described above. Note however that in step S91, the processing section 21 receives, via the communication section 25, the orb count information transmitted from the server 1 in the process of step S51 described above. Then, the processing section 21 updates the orb count information stored in the storage section 22 so that the number of orbs is equal to that represented by the received orb count information. In the first embodiment, a selection image including the user's orb count image 32 representing the updated orb count information is displayed. Following step S91, the process of step S92 is executed.

In step S92, the processing section 21 transmits the selection instruction information to the server 1 in response to a selection instruction from the user. The process of step S92 is similar to the process of step S86 described above. Following step S92, the process of step S87 is executed again. Thereafter, the processing section 21 repeatedly executes the series of steps S87 to S92 until the draw state is ended (i.e., until the determination result of step S88 is affirmative or the determination result of step S90 is negative). The terminal-side draw mode process is as described above.

Referring back to FIG. 12, when the draw mode of step S66 is ended, the processing section 11 executes the process of step S61 again.

On the other hand, in step S67, the processing section 21 executes the game process in accordance with the operation accepted in step S61. There is no limitation on the game process executed in step S67. The game process may be a process using a character that has been acquired through a draw. For example, when an operation on a character that has been acquired through a draw is accepted, the processing section 21 executes a process of controlling the action of the character. For example, when an operation of changing the game state is accepted, the processing section 21 transmits the state notification information described above to the server 1 via the communication section 25. For example, when an operation of giving a purchase instruction described above is accepted, the processing section 21 transmits the purchase instruction information described above to the server 1 via the communication section 25. Following step S67, the process of step S68 is executed.

In step S68, the processing section 21 determines whether or not to end the game. For example, the processing section 21 determines to end the game when a game-ending instruction is given by the user or when communication between the terminal device 2 and the server 1 has been discontinued over a predetermined amount of time. If the determination result of step S68 is affirmative, the processing section 21 ends the terminal process shown in FIG. 12. On the other hand, if the determination result of step S68 is negative, the process of step S61 is executed again. The processing section 21 repeatedly executes the series of steps S61 to S68 until it is determined in step S68 to end the game.

Second Embodiment

Next, the second embodiment will be described. In the second embodiment, when performing a character draw, the user specifies one of the characters owned by the user, and the server 1 performs a draw modified based on the specified character. Specifically, the server 1 alters, based on the specified character, the predetermined choice probability (i.e., standard choice probability) of at least some of the draw-object characters. For example, when two characters are on good terms with each other under the setting of the game (e.g., characters who are friends, lovers, brothers, etc., with each other) and when one of such two characters is specified, the standard choice probability is altered so that the other one of the two characters is more likely to be drawn. According to the second embodiment, the user can specify a character to thereby alter the choice probability, allowing user's intention to be reflected in the draw. The second embodiment will now be described below while focusing on differences from the first embodiment.

Note that the information processing system of the second embodiment has the same hardware configuration as that of the first embodiment, and the detailed description of the hardware configuration will be omitted. In the description of the second embodiment, the same elements and process steps as those of the first embodiment will be denoted by the same reference signs as those of the first embodiment.

Figure 14:
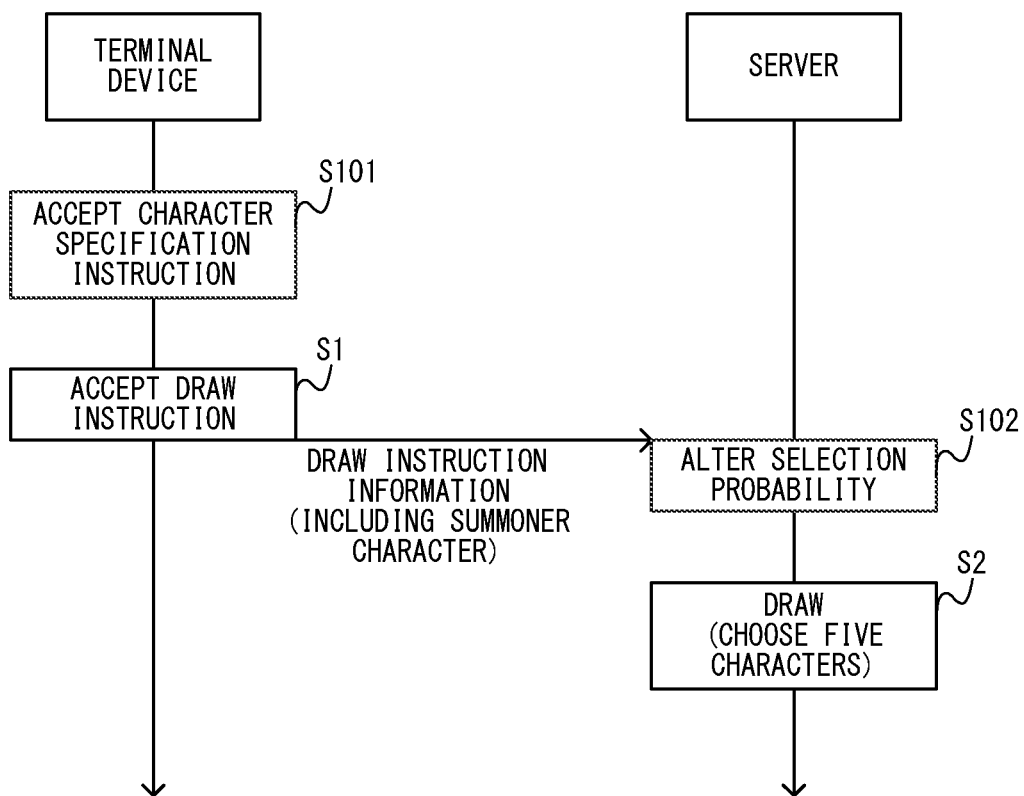
FIG. 14 is an example flow of a process to be executed by an information processing system in a draw mode according to a second embodiment.

FIG. 14 is a diagram showing an example flow of a process to be executed by the information processing system in the draw mode in the second embodiment. In the draw mode in the second embodiment, first, in step S101, the terminal device 2 accepts a character specification instruction. The character specification instruction is an instruction of specifying one of the characters already owned by the user to be used in a summoning (i.e., drawing) process. Note that the character specified herein becomes a summoner who summons a new character. Therefore, the character specified by a character specification instruction will be hereinafter referred to as the "summoner character". In step S101, the terminal device 2 displays, on the display section 24, a list image representing a list of characters already owned by the user. The user can give a character specification instruction by specifying (i.e., performing an operation of touching the image) an image of the character specified as the summoner character. Note that the specified character may have any role in the game. For example, in other embodiments, the specified character may be a character who assists the player who is a summoner.

In the second embodiment, following step S101 described above, the process of step S1 is executed as in the first embodiment. When a draw instruction is accepted by the process of step S1, the terminal device 2 transmits draw instruction information to the server 1. In the second embodiment, the draw instruction information further includes information representing the summoner character specified in step S101.

Note that while the information processing system separately accepts a character specification instruction and a draw instruction in the second embodiment, a character specification instruction may function also as a draw instruction in other embodiments. That is, the information processing system may accept a character specification instruction and may perform the draw (specifically, execute steps S102 and S2) in response to the character specification instruction.

Note that in the second embodiment, the processing section 21 of the terminal device 2 may execute the process of step S101 described above before the process of step S81 in the terminal-side draw mode process shown in FIG. 13. Specifically, in step S101, the processing section 21 obtains input information from the input section 23 to determine whether or not an operation of giving a character specification instruction has been performed based on the obtained input information. Note that the processing section 21 repeats the determination until an operation of giving a character specification instruction is performed. Then, when an operation of giving a character specification instruction is performed, the processing section 21 stores, in a memory or the storage section 22, character identification information representing the summoner character specified by the character specification instruction. When transmitting the draw instruction information to the server 1 in step S83, the processing section 21 generates draw instruction information including the character identification information stored in a memory or in the storage section 22 and transmits the draw instruction information to the server 1.

When the draw instruction information is received, the server 1 updates the choice probability of at least one draw-object character based on the summoner character specified by the character specification instruction (step S102). Also in the second embodiment, as in the first embodiment, the server 1 stores character choice information representing a predetermined choice probability (i.e., standard choice probability) for each draw-object character. Note that the choice probability is a numerical value representing the degree of choice probability (e.g., the larger the numerical value is, the more likely the character is selected), and the numerical value may be expressed as an integer or a decimal, or may be expressed as a percentage. In step S102, the standard choice probability is altered for at least one draw-object character that is determined based on the summoner character.

In the second embodiment, the server 1 stores the character relevance information and alters the standard choice probability based on the character relevance information. FIG. 15 is a diagram showing an example character relevance information. As shown in FIG. 15, the character relevance information is information that associates together a summoner character, a probability-altered character and the relevance therebetween. The probability-altered character represents a character whose choice probability is altered when the summoner character associated with the character is specified by the character specification instruction. The relevance is used for determining the degree by which the choice probability of the probability-altered character associated therewith is to be altered. The relevance is determined based on the degree of relation under the setting of the game between the summoner character associated therewith and the probability-altered character associated therewith (e.g., on how good terms they are with each other), for example. Note that the content of the character relevance information may or may not be changed based on the game status (e.g., the progress of the game, etc.).

In the example shown in FIG. 15, character B, as the probability-altered character, is associated with character A, as the summoner character, and the relevance therebetween is set to "+10". This indicates that when character A is specified as the summoner, the server 1 increases the choice probability of character B by a numerical value that is determined based on "+10". For example, when the standard choice probability of the draw-object character is a numerical value representing the degree of choice probability (e.g., the larger the numerical value is, the more likely the character is selected), the server 1 may use, as the altered choice probability, a value obtained by adding together this numerical value and a numerical value that is represented by the relevance. Note that the relevance may be a negative numerical value representing a decrease in choice probability, as well as a positive numerical value representing an increase in choice probability. In the character relevance information, a plurality of probability-altered characters may be associated with one summoner character. Moreover, the user may be allowed to specify a plurality of summoner characters in a character specification instruction, in which case one or more probability-altered character may be associated with a plurality of summoner character in the character relevance information.

In other embodiments, the character relevance information may be information that associates summoner characters with attributes. When such information is used, the server 1 may alter the choice probability of each character having the attribute that is associated with the specified summoner character (by a degree that is determined in accordance with the relevance). Then, the user can specify a summoner character so that characters having a particular attribute are more likely to be chosen by a draw.

In other embodiments, in addition to (or instead of) altering the standard choice probability of a character (i.e., a probability-altered character) that is associated with the summoner character, the server 1 may alter the standard choice probability depending on the attribute of the summoner character. For example, the server 1 may increase (or decrease) the standard choice probability of those of the draw-object characters that have the same attribute as that of the summoner character. In other embodiments, alteration to characters associated with the summoner character and alteration depending on the attribute of the summoner character may be combined together. That is, the server 1 may alter (e.g., increase) the standard choice probability of those of the draw-object characters that are associated with the summoner character, and alter (e.g., decrease) the standard choice probability of those characters that have attributes different from that of the summoner character. Thus, alteration to characters associated with the summoner character and alteration depending on the attribute of the summoner character may be of opposite directions, i.e., increasing and decreasing the standard choice probability.

Note that the server 1 may alter the choice probability based on the game status (e.g., the progress of the story of the game), etc., in addition to altering the choice probability based on the summoner character.

In the second embodiment, following step S102 described above, the process of step S2 is executed as in the first embodiment. The process of step S2 is similar to the process in the first embodiment except that the draw is performed based on a choice probability that has been altered through the process of step S102. Thus, the draw is performed with a choice probability determined depending on the summoner character. Note that the process flow subsequent to step S2 of FIG. 14 is the same as that of FIG. 6, and therefore the process flow subsequent to step S2 is omitted.

Note that in the second embodiment, the processing section 11 of the server 1 executes the process of step S102 described above, prior to the process of step S41, in the server-side draw mode process shown in FIG. 10. Specifically, in step S102, the processing section 11 determines the character whose standard choice probability is to be altered and the degree of alteration to the standard choice probability based on the summoner character represented by the draw instruction information received from the terminal device 2 and the character relevance information stored in the storage section 12. Based on the determined character and the determined degree of alteration, the processing section 11 calculates a choice probability obtained by altering the standard choice probability represented by the character choice information stored in the storage section 12.

The processing section 11 stores information representing the calculated altered choice probability in a memory or the storage section 12. Then, in step S41, the processing section 11 performs the draw using the altered choice probability stored in a memory or the storage section 12.

Note that in other embodiments, at the time of accepting a draw instruction (or before accepting a draw instruction) after a character specification instruction is given, information related to the alteration to the choice probability may be presented to the user on the terminal device 2. Specifically, before transmitting the draw instruction information, the terminal device 2 transmits instruction information representing a character specification instruction (referred to as "character specification instruction information") to the server 1. When receiving the character specification instruction information, the server 1 alters the standard choice probability based on the received character specification instruction information. Then, the server 1 transmits, to the terminal device 2, alteration information related to the alteration to the standard choice probability. There is no limitation on the content of the alteration information, and it may be information representing a character whose standard choice probability has been altered, or may be information representing a character whose standard choice probability has been altered and the degree of alteration.

When the alteration information described above is received from the server 1, the terminal device 2 displays the content represented by the alteration information on the display section 24. For example, an alteration notification image including an image of the character whose choice probability is altered and an image representing the degree of alteration (e.g., a message reading "probability of drawing has increased by 10%") may be displayed on the display section 24. Then, the draw instruction image 31 may be displayed together with the alteration notification image, to thereby accept a draw instruction.

As the alteration to the standard choice probability is presented to the user as described above, before giving a draw instruction, the user can determine whether or not to give a draw instruction after checking the alteration. Thus, it is possible to improve the convenience of the draw process.

In other embodiments, characters that can be specified in a character specification instruction are not limited to those already owned by the user. For example, in other embodiments, the user may be allowed to specify a draw-object character in a character specification instruction. Alternatively, characters that can be specified in a character specification instruction may be determined based on the game status (e.g., the progress of the story of the game).

In other embodiments, objects that can be specified in a character specification instruction may include those other than objects of draw (i.e., those that are not objects of draw). For example, the user may be allowed to specify, in a character specification instruction described above, a character that can be obtained by a method other than the draw. In other embodiments, objects that can be specified in a character specification instruction may be those of a different type from objects of draw. For example, objects that can be specified in a character specification instruction may be characters that can be controlled by the player, whereas objects of draw may be items to be used by characters, for example. Moreover, the information processing system may accept an instruction of specifying an item, in place of a character specification instruction, and may alter the choice probability for the draw of selecting a character as the object of draw depending on the specified item, for example.

In the second embodiment, the server 1 may choose only one character in the draw of step S2 (in other words, step S41). Then, the user does not give a selection instruction as described above, but the one character chosen by a draw is awarded to the user. In the second embodiment, since a character specification instruction is accepted, it is possible to realize an advantageous effect that user's intention can be reflected in the draw even with a configuration in which a selection instruction is not accepted.

In the second embodiment, the information processing system may accept a draw instruction without accepting a character specification instruction and execute a draw process in response to the draw instruction, as well as executing a draw process in response to a character specification instruction and a draw instruction. Then, the server 1 executes a draw process by using the standard choice probability as it is.

<Variation of First and Second Embodiments>

(Variation Regarding Draw)

When a plurality of choices chosen by a draw are presented in the first and second embodiments, the method of drawing may be as follows. Variations regarding the draw of the first and second embodiments will now be described.

(First Variation)

In the first variation, information with which it is possible to identify selection candidate characters is presented, instead of attribute symbols. That is, in the first variation, in steps S5, S9 and S13 described above, the terminal device 2 displays, on the display section 24, a selection image including images representing faces and/or names of the selection candidate characters. Then, the user selects a character from the set of choices, which is the draw result, the user can select a particular desired character.

(Second Variation)

Figure 16:
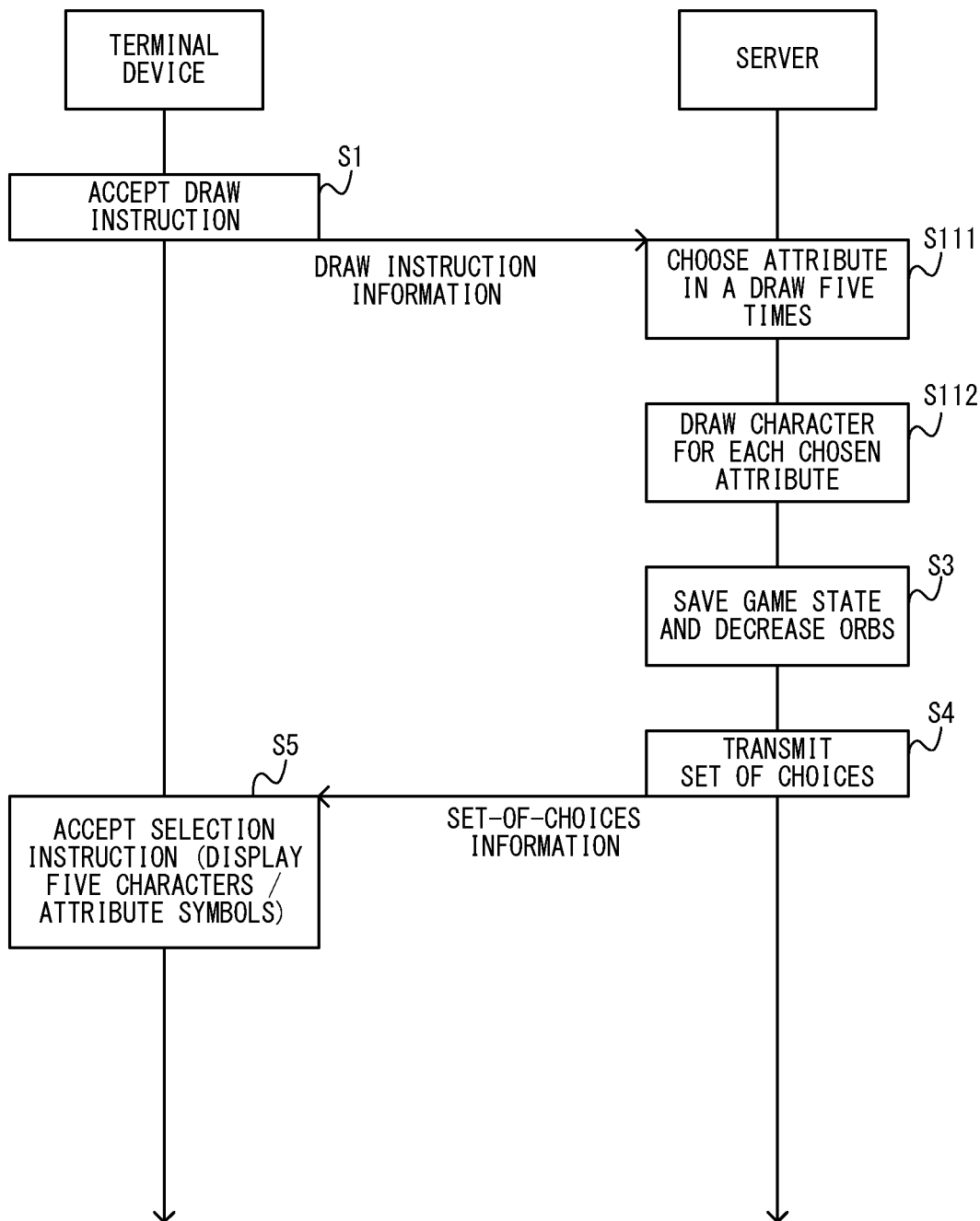
FIG. 16 is an example flow of a process to be executed by an information processing system in a draw mode according to a second variation.

In the second variation, the server 1 separately executes a draw to choose attributes and a draw to choose characters. FIG. 16 is a diagram showing an example flow of a process to be executed by the information processing system in the draw mode according to the second variation.

In the second variation, after the process of step S1 is executed as in the first embodiment, the server 1 chooses an attribute through a draw the same number of times (herein, five times) as the initial candidate number (step S111). That is, the server 1 executes, five times, the process of choosing one of the four attributes (the red attribute, the blue attribute, the green attribute and the clear-color attribute). Note that there may be redundancy permitted among the five attributes to be chosen in five draws (i.e., any attribute may be chosen a plurality of times). In the second variation, the storage section 12 stores information indicating a numerical value representing a choice probability for each of the four attributes. The processing section 11 executes the draw using this information. As information representing the draw result, the processing section 11 generates five pieces of information representing attributes and stores them in a memory or the storage section 12.

Next, the server 1 chooses a character for each of the attributes chosen in step S111 (step S112). That is, the server 1 draws one of the characters (objects of draw) having the respective attributes chosen in step S111. In the second variation, since the attribute is chosen five times in step S111, the server 1 performs the operation of drawing a character five times. Herein, the same attribute may be chosen a plurality of times over the course of five draws, in which case the server 1 performs the draw a plurality of times for that attribute. Note that the draw in the second variation may be executed by a similar method to that of the first embodiment even though characters to be objects of draw are different from the first embodiment.

In the processes of steps S111 and S112 described above, the same number of selection candidate characters as the initial candidate number are chosen. Then, the server 1 executes the processes of steps S3 and S4 described above as in the first embodiment. In the second variation, in step S5 to follow, the terminal device 2 may present symbols with which it is possible to identify the attribute (while it is not possible to identify the character itself) as in the first embodiment, or may present information with which it is possible to identify the character itself as in the first variation described above. Note that the process flow subsequent to step S5 of FIG. 16 is the same as that of FIG. 6, and therefore the process flow subsequent to step S5 is omitted.

According to the second variation described above, the server 1 first performs a draw to choose an attribute and further chooses a selection candidate character from a pool of characters of the chosen attribute. Then, the server 1 can perform the draw using characters having the same attribute as objects of draw.

(Third Variation)

Also in the third variation, as in the second variation, the server 1 separately executes a draw of choosing an attribute and a draw of choosing a character. Herein, in the third variation, after the server 1 chooses attributes by a draw, the user selects an attribute and the server 1 chooses a character by performing a draw for the attribute selected by the user. The details of the third variation will now be described.

Figure 17:
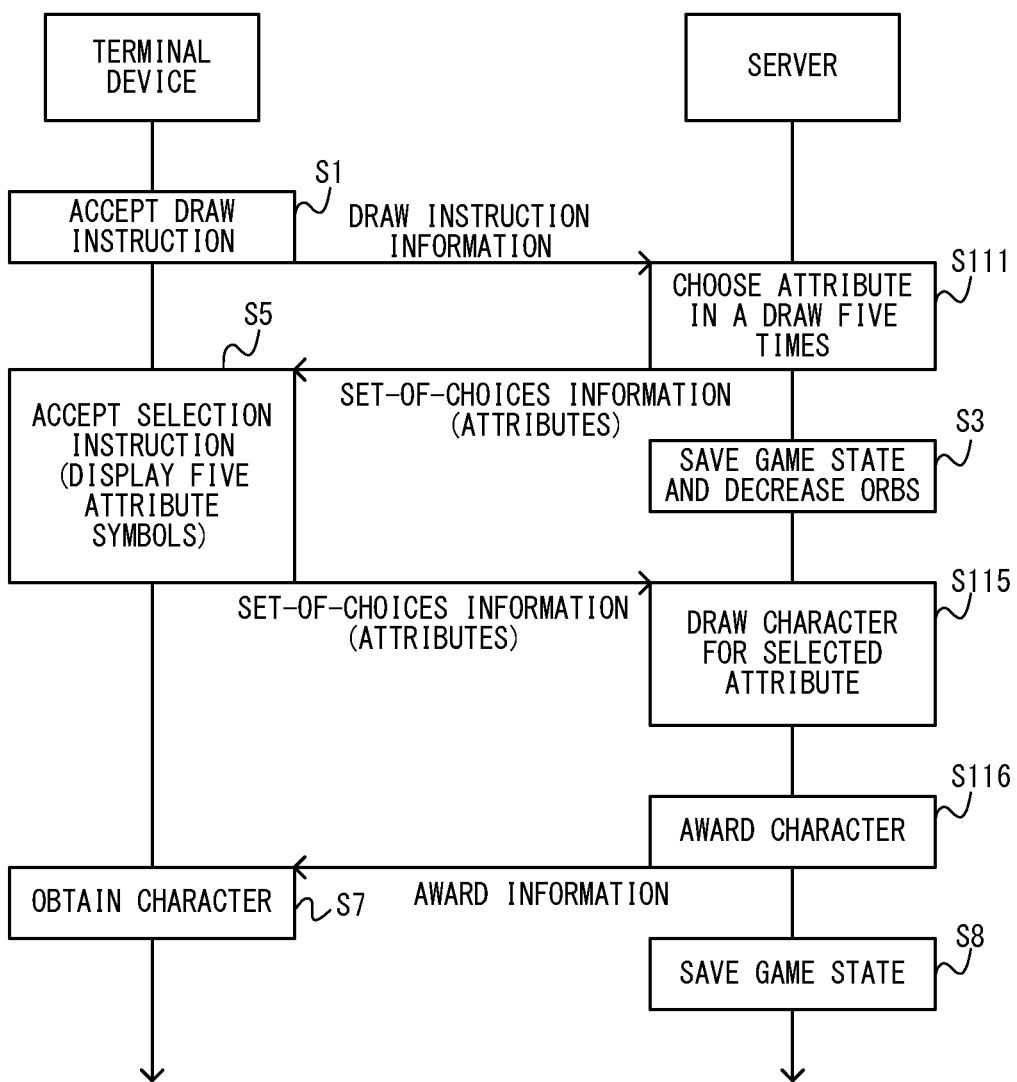
FIG. 17 is a diagram showing an example flow of a process to be executed by an information processing system in a draw mode according to a third variation.

FIG. 17 is a diagram showing an example flow of a process to be executed by an information processing system in the draw mode according to the third variation. Also in the third variation, as in the second variation, the processes of steps S1 and S111 are executed. Herein, in the third variation, the server 1 transmits, to the terminal device 2, set-of-choices information that includes five pieces of information representing the attributes, which is the draw result of step S111. At this point, only the attributes have been chosen and the selection candidate characters have not been chosen, and therefore the set-of-choices information described above does not include information including selection candidate characters. In the third variation, following step S111 described above, the server 1 executes the process of step S3 similar to that of the first embodiment.

In the third variation, the terminal device 2 receives the set-of-choices information described above in step S5 and displays the selection image on the display section 24. The selection image is the same as that of the first embodiment (FIG. 4(B)), and can be generated based on the set-of-choices information described above. When the user gives a selection instruction for selecting an attribute (specifically, the attribute symbol 33) on the selection image, the terminal device 2 transmits, to the server 1, the selection instruction information including information representing the selected attribute.

When the selection instruction information is received, the server 1 performs a draw using characters having the attribute represented by the selection instruction information as objects of draw, thereby choosing one character (step S115). This draw can be performed by a similar method to that of the draw of choosing a character in the second variation.

Following step S115 described above, the server 1 executes the process of awarding the user with the character chosen by a draw (step S116). The process of step S116 is different from the process of step S6 described above in terms of whether the character to be awarded is a character selected by the user (the first embodiment) or the character to be awarded is a character chosen by a draw (the third variation). Note however that the process of awarding a character is the same between step S116 and step S6.

Following step S6, the server 1 executes the process of step S7 as in the first embodiment. On the other hand, when receiving the award information transmitted from the server 1 in step S6, the terminal device 2 executes the process of step S8 as in the first embodiment.

Although the process subsequent to step S8 is not shown in FIG. 17, the user can select any desired number of choices from the set of five choices also in the third variation as in the first embodiment. Note that in the third variation, when the attribute symbol 33 is selected on the selection screen for the second draw or later (i.e., a selection screen where there are four or less choices of attribute symbols), the terminal device 2 transmits, to the server 1, selection instruction information including information representing the selected attribute, as in step S5 of the third variation. In response to receiving the selection instruction information, the server 1 chooses one character through a draw of which the objects of draw are characters having the attribute or attributes represented by the received selection instruction information as in step S115 described above. The server 1 further executes the process of awarding the chosen character to the user as in step S116 described above.

In the third variation described above, as in the second variation, the server 1 can perform a draw of which the objects of draw are characters having the same attribute. The server 1 executes an operation of drawing a character only for the attribute selected by the user from the set of choices, and it is therefore possible to efficiently execute a draw process.

Note that the first to third variations described above are also applicable to the second embodiment. Note that when the third variation is applied to the second embodiment, the server 1 alters the choice probability of choosing an attribute by using the character relevance information in which the summoner character is associated with the attribute.

(Variation Regarding Processes on Server and Terminal Device)

In other embodiments, some of the processes executed on the server side in the first and second embodiments described above may be executed on the terminal side. In other embodiments, some of the processes executed on the terminal side in the embodiments described above may be executed on the server side.

<Functions and Effects of the Present Embodiment>

(1-1)

As described above, in the first and second embodiments, the information processing system includes the server 1 capable of communicating with the terminal device 2 capable of executing an application. The information processing system includes the following elements:

a storage unit (e.g., the storage section 12) provided on the server 1 and configured to store information (e.g., game character information shown in FIG. 8) regarding a plurality of objects in an application executed on the terminal device 2;

a draw instruction accepting unit (e.g., step S31 shown in FIG. 9 or step S81 shown in FIG. 13) configured to accept an instruction from a user of the application for the draw through which the user obtains an object in the application;

a set-of-choices determination unit (e.g., step S41 shown in FIG. 10) provided on the server 1 and configured to determine a predetermined number ("initial candidate number") of objects or object groups as a set of choices in response to the draw instruction, the predetermined number being two or more;

a display control unit (e.g., steps S44 and S46 shown in FIG. 10 or step S85 shown in FIG. 13) configured to display, on the display section 24 of the terminal device 2, information regarding the selection candidates included in the determined set of choices (e.g., the attribute symbol 33 shown in FIG. 4);

a selection instruction accepting unit (e.g., steps S45 and S51 shown in FIG. 10 or step S86 shown in FIG. 13) configured to accept a selection instruction from the user to select one of the selection candidates; and an object awarding unit (e.g., step S46 shown in FIG. 10) provided on the server 1 and configured to award the user with an object corresponding to the selection candidate selected by the selection instruction.

While the "object" is a character appearing in the application in the first embodiment, it may be any object such as an item, or the like.

The accepting unit described above (the draw instruction accepting unit and the selection instruction accepting unit) may be an element of the terminal device 2 configured to accept an input from the user giving an instruction (e.g., the processing section 21 and/or the input section 23) or an element of the server 1 configured to obtain information representing an instruction from the terminal device 2.

The set-of-choices determination unit described above may determine objects (e.g., characters) themselves as the set of choices, or may determine object groups (e.g., attributes assigned to characters) as the set of choices. Note that in the first embodiment, the server 1 chooses selection candidate characters, and attributes assigned to the chosen selection candidate characters are presented to the user. Therefore, the process of step S41 can be said to determine characters themselves as a set of choices or can be said to determine character groups (e.g., attributes) as a set of choices.

The "information regarding the selection candidates" may be information representing selection candidates themselves (e.g., information representing faces or names of the characters) or may be information representing selection candidate groups (e.g., information representing attributes assigned to characters).

In the first and second embodiments, in response to the transmission of information (e.g., set-of-choices information) from the server 1 to the terminal device 2, information regarding selection candidates is displayed on the terminal device 2. Therefore, the display control unit described above can be said to be an element on the terminal device 2 configured to control the display section 24 or can be said to be an element on the server 1 configured to transmit the information described above to the terminal device 2.

With configuration (1-1) above, a set of choices including a plurality of objects (or object groups) is presented to the user, and the user can acquire an object by making a selection from the set of choices. Thus, user's intention can be reflected in the draw for obtaining an object. Therefore, since the user is more likely to obtain a desired draw result, it is possible to reduce the possibility that the user feels unsatisfied with the draw result.

(1-2)

In the first embodiment, the set-of-choices determination unit determines the predetermined number ("initial candidate number") of objects as a set of choices. The display control unit displays predetermined information assigned to the objects included in the set of choices on the display section 24.

(1-3)

In the first and second embodiments, the set-of-choices determination unit can be said to determine the predetermined number ("initial candidate number") of object groups as a set of choices. The display control unit displays predetermined information representing the groups included in the set of choices on the display section 24.

With configuration (1-2) or (1-3) above, the user can make a selection based on predetermined information regarding objects. That is, since the information processing system can give the user a basis of judgment for selection, it is possible to enhance the strategic aspect of the draw and improve the playability of the draw.

(1-4)

In the first and second embodiments, the objects are each assigned at least one of a number of attributes, the number of attributes being smaller than the number of objects (see FIG. 5). The predetermined information is information representing the attributes assigned to the objects.

With configuration (1-4) above, since information representing attributes (which are information with which it is not possible to uniquely identify objects) is displayed, it is made impossible to completely identify selection candidate objects at the point when the user makes the selection. This enhances the playability of the draw while preventing the draw from being too advantageous for the user.

(1-5)

In the first and second embodiments, after a selection instruction for a selection candidate is accepted, the display control unit displays, on the display section of the terminal device, information regarding the remaining selection candidates excluding the selection candidate that has been selected by the selection instruction (FIG. 4(D)). The selection instruction accepting unit accepts an additional selection instruction for selecting one of the remaining selection candidates (e.g., step S45 shown in FIG. 10 or step S92 shown in FIG. 13). The object awarding unit awards an object corresponding to the selection candidate that has been selected by the additional selection instruction to the user.

With configuration (1-5) above, the user can select more than one choices from the set of choices and acquire a plurality of objects. Thus, it is possible to improve the convenience of the process of acquiring objects through a draw.

(1-6)

In the first and second embodiments, in response to acceptance of a selection instruction selecting a remaining selection candidate, the display control unit is capable of executing the process of displaying, on the display section of the terminal device, a new set of remaining selection candidates excluding the selection candidate that has been selected by the selection instruction, until there is no longer selection candidate left (e.g., steps S45 to S51 shown in FIG. 10). Each time a new set of remaining selection candidates is displayed, the selection instruction accepting unit accepts an additional selection instruction.

With configuration (1-6) above, the user can select all the choices from the set of choices and acquire all the objects from the set of choices. Thus, it is possible to improve the convenience of the process of acquiring objects through a draw.

(1-7)

In the first and second embodiments, the storage unit stores the number of points owned by the user in the application (see the orb count information shown in FIG. 8). The selection instruction accepting unit accepts an additional selection instruction at least on the condition that the points owned by the user are decreased (e.g., step S45 shown in FIG. 10). The selection instruction accepting unit is configured so that the number of points (e.g., eight) that is required for a first selection instruction to be given when the number of selection candidates that can be selected is equal to a first number (e.g., when the number of selection candidate characters is two; in other words, when giving a selection instruction for the fourth draw) is smaller than the number of points (e.g., nine) that is required for a second selection instruction to be given when the number of selection candidates that can be selected is equal to a second number greater than the first number (e.g., when the number of selection candidate characters is four; in other words, when giving a selection instruction for the second draw).

The "points" may refer to the number of orbs in the first embodiment or may refer to any points or virtual currency used in the application.

With configuration (1-7) above, the user can be motivated to select many choices from the set of choices. The user can perform the draw while employing one of the following two strategies: (a) ending the draw and starting over the draw with the intention of achieving a better draw result; and (b) continuously making selections so as to conserve orbs. Thus, it is possible to enhance the strategic aspect of the draw.

(1-8)

In the first and second embodiments, the storage unit stores state information (e.g., game state information) in which information regarding selection candidates that can be selected by a selection instruction (e.g., candidate character information) is associated with information regarding the user who can give the selection instruction (e.g., user information) (FIG. 8).

(1-9)

In the first and second embodiments, when the application is resumed in response to a resumption instruction from the user after the application was discontinued while information regarding the selection candidates was displayed on the display section 24, the display control unit displays, on the display section, information regarding the selection candidates that were displayed before the discontinuation, by using the state information stored in the storage section (e.g., step S23 or S24 shown in FIG. 7).

With configurations (1-8) and (1-9) above, even when the application is discontinued while the set of choices is presented to the user (in other words, in a state in which the user can make a selection), the application can be resumed starting from that state.

(1-10)

In the first and second embodiments, the storage unit stores the number of points owned by the user in the application (the orb count information shown in FIG. 8). The draw instruction accepting unit accepts a draw instruction at least on the condition that a predetermined number of points are subtracted from the points owned by the user (e.g., step S42 shown in FIG. 10).

With configuration (1-10) above, it is possible to discourage the user from starting over the draw after seeing the set of choices. Thus, it is possible to prevent the network traffic from increasing due to the user giving draw instructions over and over. It is also possible to prevent the draw from being too advantageous for the user.

(1-11)

In the first and second embodiments, the information processing system further includes a point awarding unit (e.g., step S37 shown in FIG. 9) configured to increase the number of points stored in the storage section for a user on the condition that the user is charged for the added points.

(1-12)

Note that in other embodiments, the information processing system may accept a draw instruction and/or a selection instruction on the condition that the user is charged for the instruction. That is, although the server 1 decreases orbs when executing a draw in the first embodiment, the server 1 may execute a charging process when executing a draw. Alternatively, the server 1 may execute a charging process when accepting a selection instruction.

With configuration (1-11) or (1-12) above, it is possible to enhance the effect of discouraging the user from starting over the draw after seen the set of choices.

(1-13)

In the first and second embodiments, the draw instruction accepting unit, the display control unit and the selection instruction accepting unit are provided on the server 1. The draw instruction accepting unit receives information of a draw instruction (i.e., draw instruction information) that is transmitted from the terminal device 2 based on an input from the user performed on the terminal device 2, thereby accepting the instruction. The display control unit transmits information regarding selection candidates included in the determined set of choices (i.e., information of selection candidate characters included in set-of-choices information) to the terminal device 2, thereby displaying the information on the display section 24 of the terminal device 2. The selection instruction accepting unit receives information of a selection instruction (i.e., selection instruction information) that is transmitted from the terminal device 2 based on an input from the user performed on the terminal device 2, thereby accepting the selection instruction.

(1-14)

In the first and second embodiments, the information processing system further includes a game process unit configured to execute a predetermined game process using an object that has been awarded to the user (e.g., step S37 shown in FIG. 9 or step S67 shown in FIG. 12).

With configuration (1-14) above, user's intention can be reflected in the draw for obtaining an object to be used in the game process.

(2-1)

In the second embodiment, the information processing system includes the server 1 capable of communicating with the terminal device 2 capable of executing an application. The information processing system includes the following elements:

a storage unit (e.g., the storage section 12) provided on the server 1 and configured to store information (e.g., character choice information shown in FIG. 8) representing a choice probability (e.g., standard choice probability), for each of a plurality of objects in an application executed on the terminal device 2, for the draw whereby the user of the application obtains an object;

a specification instruction accepting unit (e.g., step S101 shown in FIG. 14) configured to accept an object specification instruction of specifying a relevant object (e.g., a summoner character) to be associated with the draw process from among the objects in the application (note that the "objects" may be objects that can be obtained through a draw or may be other objects, and the "objects" may be objects of the same type as those that can be obtained through a draw or may be objects of a different type);

a probability alteration unit (e.g., step S102 shown in FIG. 14) provided on the server 1 and configured to alter the choice probability at least for some of the objects depending on the specified relevant object;

a choosing unit (e.g., step S2 shown in FIG. 14) provided on the server 1 and configured to choose at least one object from among the objects that can be obtained through a draw based on the altered choice probability obtained by altering the choice probability; and an object awarding unit (e.g., step S46 shown in FIG. 10) provided on the server 1 and configured to award one or more of the chosen objects to the user.

With configuration (2-1) above, the probability with which each character is chosen by a draw is altered depending on the object specified in the object specification instruction. Thus, user's intention can be reflected in the draw for obtaining an object. Therefore, since the user can specify an object so that the user is more likely to obtain a desired draw result, it is possible to reduce the possibility that the user feels unsatisfied with the draw result.

(2-2)

In the second embodiment, the specification instruction accepting unit accepts an object specification instruction of specifying a relevant object from among the objects owned by the user in the application.

With configuration (2-2) above, the user can performed the draw more advantageously by increasing the objects owned by the user. That is, with the configuration described above, the user tries to increase the objects owned by the user in order to perform the draw more advantageously, and it is thus possible to motivate the user to perform the draw for obtaining objects.

(2-3)

In the second embodiment, the specification instruction accepting unit accepts an object specification instruction of specifying a relevant object from among objects that can be obtained through a draw (e.g., draw-object characters).

With configuration (2-3) above, the choice probability is altered depending on the relationship between objects that can be obtained through a draw, and it is therefore possible to improve the playability of the draw.

(2-4)

In the second embodiment, the storage unit stores relevance information (e.g., character relevance information) representing the relevance between at least some of the objects in the application and other objects. The probability alteration unit alters the choice probability based on the relevance information assigned to the specified relevant object.

The relevance information may be information in which an object is associated with another object of which the choice probability is altered when the first object is specified, for example. For example, the relevance information may be information representing the degree of relevance (e.g., closeness) between an object and another object of which the choice probability is altered when the first object is specified. In this case, the choice probability may be altered based on the degree of relevance.

With configuration (2-4) above, the choice probability can be altered based on the relevance between two objects. For example, the choice probability can be altered based on the relationship between two characters in the game, and it is therefore possible to improve the playability of the draw.

(2-5)

In the second embodiment, the probability alteration unit alters the choice probability assigned to an object (e.g., a probability-altered character shown in FIG. 15) that is associated in the relevance information with a relevant object so that the object is more likely to be chosen.

With configuration (2-5) above, the user can make it more likely that objects that are relevant to an object specified by the user are chosen by a draw. Thus, it is possible to alter the choice probability in a manner that is easy to understand for the user.

(2-6)

In the second embodiment, the choosing unit chooses an object (e.g., steps S42 and S51 shown in FIG. 10) at least on the condition that a predetermined number of points are subtracted from the points owned by the user in response to receiving, from the terminal device 2, instruction information including a draw instruction and an object specification instruction.

With configuration (2-6) above, it is possible to discourage the user from starting over the draw after giving a draw instruction and an object specification instruction. Thus, it is possible to prevent the network traffic from increasing due to the user giving instructions over and over. It is also possible to prevent the draw from being too advantageous for the user.

(2-7)

In the second embodiment, the choosing unit chooses a plurality of objects from among the objects (e.g., step S2 shown in FIG. 14). The object awarding unit awards one of the plurality of chosen objects that is selected by the user to the user (e.g., step S46 shown in FIG. 10).

With configuration (2-7) above, one of the plurality of objects chosen by a draw that is selected by the user is awarded to the user. Then, user's intention can be better reflected in the draw for obtaining objects.

(2-8)

In the second embodiment, the information processing system includes a display control unit and a selection instruction accepting unit. The display control unit displays predetermined information (e.g., the attributes) of the plurality of chosen objects on the display section 24 of the terminal device 2 (see FIG. 4(B)). The selection instruction accepting unit accepts a selection instruction from the user of selecting one of the predetermined information displayed on the display section 24 (e.g., step S45 shown in FIG. 10 or step S85 shown in FIG. 13). The object awarding unit awards an object corresponding to the predetermined information selected by the selection instruction to the user (e.g., step S46 shown in FIG. 10).

With configuration (2-8) above, the user can make a selection based on the predetermined information regarding objects. That is, since the information processing system can give the user a basis of judgment for selection, it is possible to enhance the strategic aspect of the draw and improve the playability of the draw.

(2-9)

In other embodiments, the probability alteration unit may alter the choice probability based on predetermined information (e.g., the attribute) assigned to the specified relevant object.

With configuration (2-9) above, the choice probability for the draw is altered based on the predetermined information, which is used by the user as a basis of judgment for selection, and it is therefore possible to enhance the strategic aspect of the draw and improve the playability of the draw.

The embodiments described above can be used in an information processing system for performing a draw ("Gacha") in a game application, for example, with the aim of reflecting user's intention in the process of awarding an object by a draw, etc.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

The invention claimed is:

1. A system comprising:
a server computer system that is configured to communicate, via an electronic data communications network, with a terminal device that is capable of executing an application for a video game that is playable on the terminal device by a user; and
a storage medium configured to:
store a probability value for each one of a plurality of virtual objects that are obtainable for use within the video game, the stored probability values indicating a probability of obtaining a corresponding one of the plurality of virtual objects as part of a draw process, and
store relevance values that represents relevance between different virtual objects of the video game,
the server computer system comprising at least one hardware processor that is configured to:
receive, from the terminal device and based on a selection operation performed by the user on the terminal device, an instruction to select the first virtual object of the video game from among virtual objects possessed by the user within the video game, wherein the virtual objects that are specifiable by the instruction are limited to those possessed by the user;
perform a draw process to draw a second virtual object from among the plurality of virtual objects, wherein the draw process is performed such that the probability of drawing each one of the plurality of virtual objects as the second virtual object is based on the stored probability value for the respective virtual objects, except that at least one of the stored probability values is adjusted for the draw process based on a relevance value, of the stored relevance values, that is associated with the specified first virtual object; and
based on a result of performance of the draw process, award the second virtual object so as to be possessed by the user within the video game.

2. The information processing system according to claim 1, wherein the first virtual object that is selected was previously awarded to the user.

3. The information processing system according to claim 1, wherein the at least one of the stored probability values is adjusted to a new probability value(s) based on the relevance value that is associated with the selected first virtual object.

4. The information processing system according to claim 3, wherein the new probability value(s) for drawing the second virtual object is greater than the at least one of the stored probability values for the second virtual object.

5. The information processing system according to claim 1, wherein:
the storage medium is further configured to store a number of points that are usable by the user of the video game;
wherein the at least one hardware processor of the server computer system is further configured to:
accept, from the user via the terminal device, a draw instruction, wherein
acceptance of the draw instruction is conditioned on a predetermined number of points being subtracted from the number of points that are usable by the user,
wherein the draw process is performed in response to the draw instruction.

6. The information processing system according to claim 5, wherein the draw process is conditioned on a predetermined number of points being subtracted from the number of points that are usable by the user.

7. The information processing system according to claim 5, wherein the at least one hardware processor is further configured to increase the number of points that are usable by the user in response to charging for the increased points.

8. The information processing system according to claim 1, wherein:
the at least one hardware processor of the server computer system is further configured to, as part of the draw process, draw multiple virtual objects from among the plurality of virtual objects, the second virtual object being one of the multiple virtual objects; and
wherein the second virtual object is awarded further based on being selected from among the multiple virtual objects that are drawn via the draw process.

9. The information processing system according to claim 8, further comprising:
the terminal device, wherein at least one hardware processor of the terminal device is further configured to:
display, on a display coupled to the terminal device, predetermined information that is assigned to the multiple virtual objects drawn from the drawing process; and
accept an instruction to select one of the displayed predetermined information; and
wherein the second virtual object of the multiple virtual objects that corresponds to the selected one of the displayed predetermined information is awarded.

10. The information processing system according to claim 9, wherein the at least one hardware processor of the server computer system is further configured to: alter probability in the drawing process based on predetermined information assigned to the first virtual object that is selected.

11. The information processing system according to claim 1, wherein the received instruction is transmitted from the terminal device and is based on an input from the user performed on the terminal device.

12. A server comprising:
a transceiver configured to communicate with a terminal device that is capable of executing an application for a video game that is playable on the terminal device by a user;
a storage medium configured to store:
a probability value for each one of a plurality of virtual objects that are unlockable for use within the video game, the stored probability values indicating a probability of unlocking a corresponding one of the plurality of virtual objects as part of a draw process;
relevance values that represents relevance between different virtual objects of the video game;
a processing system that includes at least one hardware processor, the processing system configured to:
receive, from the terminal device and based on a selection operation performed by the user on the terminal device, an instruction that specifies a first virtual object of the video game from among virtual objects that are unlocked by the user within the video game, wherein the virtual objects that are specifiable by the instruction are limited to those possessed by the user;

perform a draw process to draw a second virtual object from among the plurality of virtual objects, wherein the draw process is performed such that the probability of drawing each one of the plurality of virtual objects as the second virtual object is based on the stored probability value for the respective virtual object, except that at least one of the stored probability values is adjusted for the draw process based on a relevance value, of the stored relevance values, that is associated with the specified first virtual object; and based on a result of performance of the draw process, unlock the second virtual object so as to be possessed by the user within the video game.

13. A non-transitory computer readable storage medium storing therein an information processing program for use on a server that includes at least one hardware processor, the server computer system configured to communicate, via an electronic data communications network, with a terminal device that is capable of executing an application for a video game that is playable on the terminal device by a user, wherein the server stores, to a memory device, a probability value for each one of a plurality of virtual objects that are obtainable for use within the video game, the stored probability values indicating a probability of obtaining a corresponding one of the plurality of virtual objects as part of a draw process, wherein the server also stores, to a memory device, relevance values that represents relevance between different virtual objects of the video game, the information processing program comprising instructions that, when executed by the at least one hardware processor, are configured to:

receive, from the terminal device and based on a selection operation performed by the user on the terminal device, an instruction that specifies a first virtual object of the video game from among virtual objects possessed by the user within the video game, wherein the virtual objects that are specifiable by the instruction are limited to those possessed by the user;

perform a draw process to draw a second virtual object from among the plurality of virtual objects, wherein the draw process is performed such that the probability of drawing each one of the plurality of virtual objects as the second virtual object is based on the stored probability value for the respective virtual objects, except that at least one of the stored probability values is adjusted for the draw process based on a relevance value, of the stored relevance values, that is associated with the specified first virtual object; and based on a result of performance of the draw process, award the second virtual object so as to be possessed by the user within the video game.

14. An information processing method for use with a server computer system that includes at least one hardware processor, the method comprising:

communicating, via an electronic data communications network, with a terminal device that is capable of executing an application for a video game that is playable on the terminal device by a user;

storing, to a memory device coupled to the server, a probability value for each one of a plurality of virtual objects that are obtainable for use within the video game, the stored probability values indicating a probability of obtaining a corresponding one of the plurality of virtual objects as part of a draw process, the information processing program comprising instructions that, when executed by the at least one hardware processor;

storing, to the memory device, relevance values that represents relevance between different virtual objects of the video game;

receiving, from the terminal device and based on a selection operation performed by the user on the terminal device, an instruction that specifies a first virtual object of the video game from among virtual objects possessed by the user within the video game, wherein the virtual objects that are specifiable by the instruction are limited to those possessed by the user;

performing a draw process to draw a second virtual object from among the plurality of virtual objects, wherein the draw process is performed such that the probability of drawing each one of the plurality of virtual objects as the second virtual object is based on the stored probability value for a respective one of the virtual objects, except that at least one of the stored probability values is adjusted for the draw process based on a relevance value, of the stored relevance values, that is associated with the specified first virtual object; and based on a result of performance of the draw process, awarding the second virtual object so as to be possessed by the user within the video game.

15. A computer system comprising:

a transceiver configured to communicate with a terminal device that is capable of executing an application for a video game that is playable on the terminal device by a user;

a storage medium configured to store:
  a probability value for each one of a plurality of virtual objects that are unlockable for use within the video game, the stored probability values indicating a probability of unlocking a corresponding one of the plurality of virtual objects as part of a draw process;
  relevance values that represents relevance between different virtual objects of the video game, wherein each of the relevance values is a numerical value that indicates how much to adjust a probability value;

a processing system that includes at least one hardware processor, the processing system configured to:
  receive an instruction that specifies a first virtual object of the video game from among virtual objects that are unlocked by the user within the video game, wherein the virtual objects that are specifiable by the instruction are limited to those possessed by the user;
  perform a draw process to draw a second virtual object from among the plurality of virtual objects, wherein the draw process is performed such that the probability of drawing each one of the plurality of virtual objects as the second virtual object is based on the stored probability value for the respective virtual object, except a calculated new probability value is used for the specified first virtual object during the draw process, the calculated new probability value being calculated from the stored probability value for the specified first virtual object and a relevance value that is associated with the specified first virtual object; and
  based on a result of performance of the draw process, unlock the second virtual object so as to be possessed by the user within the video game.

16. The computer system of claim 15, wherein the relevance value that is associated with the specified first virtual object is adjusted based on a state of the video game.

\* \* \* \* \*